US012579377B2

(12) United States Patent
Ouyang et al.

(10) Patent No.: US 12,579,377 B2
(45) Date of Patent: Mar. 17, 2026

(54) SUMMARY OF REVIEWS GENERATED BY A GENERATIVE LANGUAGE MODEL

(71) Applicant: SHOPIFY INC., Ottawa (CA)

(72) Inventors: Chuanye Ouyang, Gaithersburg, MD (US); Benjamin Lerchin, Victoria (CA); Danica Dillera, Toronto (CA)

(73) Assignee: SHOPIFY INC., Ottawa (CA)

( * ) Notice: Subject to any disclaimer, the term of this patent is extended or adjusted under 35 U.S.C. 154(b) by 222 days.

(21) Appl. No.: 18/467,995

(22) Filed: Sep. 15, 2023

(65) Prior Publication Data

US 2025/0094728 A1 Mar. 20, 2025

(51) Int. Cl.

| | |
|---|---|
| ***G06F 40/40*** | (2020.01) |
| ***G06F 16/34*** | (2025.01) |
| ***G06F 40/166*** | (2020.01) |
| ***G06F 40/284*** | (2020.01) |
| ***G06F 40/30*** | (2020.01) |
| ***G06N 20/00*** | (2019.01) |
| ***G06Q 30/0282*** | (2023.01) |
| ***G06Q 30/0601*** | (2023.01) |

(52) U.S. Cl.

CPC ............ *G06F 40/40* (2020.01); *G06F 16/345* (2019.01); *G06F 40/166* (2020.01); *G06F 40/284* (2020.01); *G06N 20/00* (2019.01); *G06Q 30/0282* (2013.01); *G06Q 30/0631* (2013.01); *G06F 40/30* (2020.01)

(58) Field of Classification Search

CPC ............ G06Q 30/0631; G06Q 30/0282; G06F 40/30; G06F 40/40; G06F 40/166; G06F 16/345; G06N 20/00

See application file for complete search history.

(56) References Cited

U.S. PATENT DOCUMENTS

| | | | | |
|---|---|---|---|---|
| 11,769,017 | B1 * | 9/2023 | Gray | G06F 40/56 704/9 |
| 2006/0129446 | A1 * | 6/2006 | Ruhl | G06Q 30/0282 705/306 |
| 2007/0078670 | A1 * | 4/2007 | Dave | G06Q 30/02 705/347 |
| 2010/0169317 | A1 | 7/2010 | Wang et al. | |
| 2010/0312725 | A1 | 12/2010 | Privault et al. | |
| 2014/0164302 | A1 * | 6/2014 | Di Fabbrizio | G06N 5/02 706/46 |
| 2019/0361987 | A1 * | 11/2019 | Qiao | G06F 16/345 |
| 2020/0175052 | A1 | 6/2020 | Wang et al. | |
| 2020/0285662 | A1 | 9/2020 | Chatterjee et al. | |
| 2021/0272177 | A1 * | 9/2021 | Banipal | G06Q 30/0629 |
| 2022/0415203 | A1 | 12/2022 | Khan et al. | |
| 2023/0230144 | A1 * | 7/2023 | Lavasanijou | G06Q 30/0631 705/26.7 |
| 2023/0410023 | A1 * | 12/2023 | Kadambi | G06F 40/30 |
| 2024/0346233 | A1 * | 10/2024 | Paulino | G06N 20/00 |
| 2025/0094728 | A1 * | 3/2025 | Ouyang | G06F 40/284 |

* cited by examiner

*Primary Examiner* — Samuel G Neway

(57) ABSTRACT

A computer-implemented method is provided. The computer-implemented method may include: assigning relevancy values to reviews of a plurality of reviews; aggregating a subset of reviews from the plurality of reviews into an input prompt, the subset of reviews selected based on the relevancy values assigned to reviews in the plurality of reviews; and inputting the input prompt into a generative language model yielding a summary review of the subset of reviews generated by the generative language model.

20 Claims, 13 Drawing Sheets

600

Start

Retrieve plurality of reviews
602

Determine Defined Number of Reviews
650

Assign relevancy value to reviews of the plurality of reviews
603

Aggregate subset of reviews (or the plurality of reviews) into an input prompt
604

Input the input prompt into a LLM to generate a summary review of the subset of reviews (or the plurality of reviews)
606

Generate attribute data for the subset of reviews (or the plurality of reviews)
610

Generate an initial summary based on the attribute data
612

Generate a final summary based on the initial summary and one or more example summary reviews
614

Store/transmit review summary
608

End

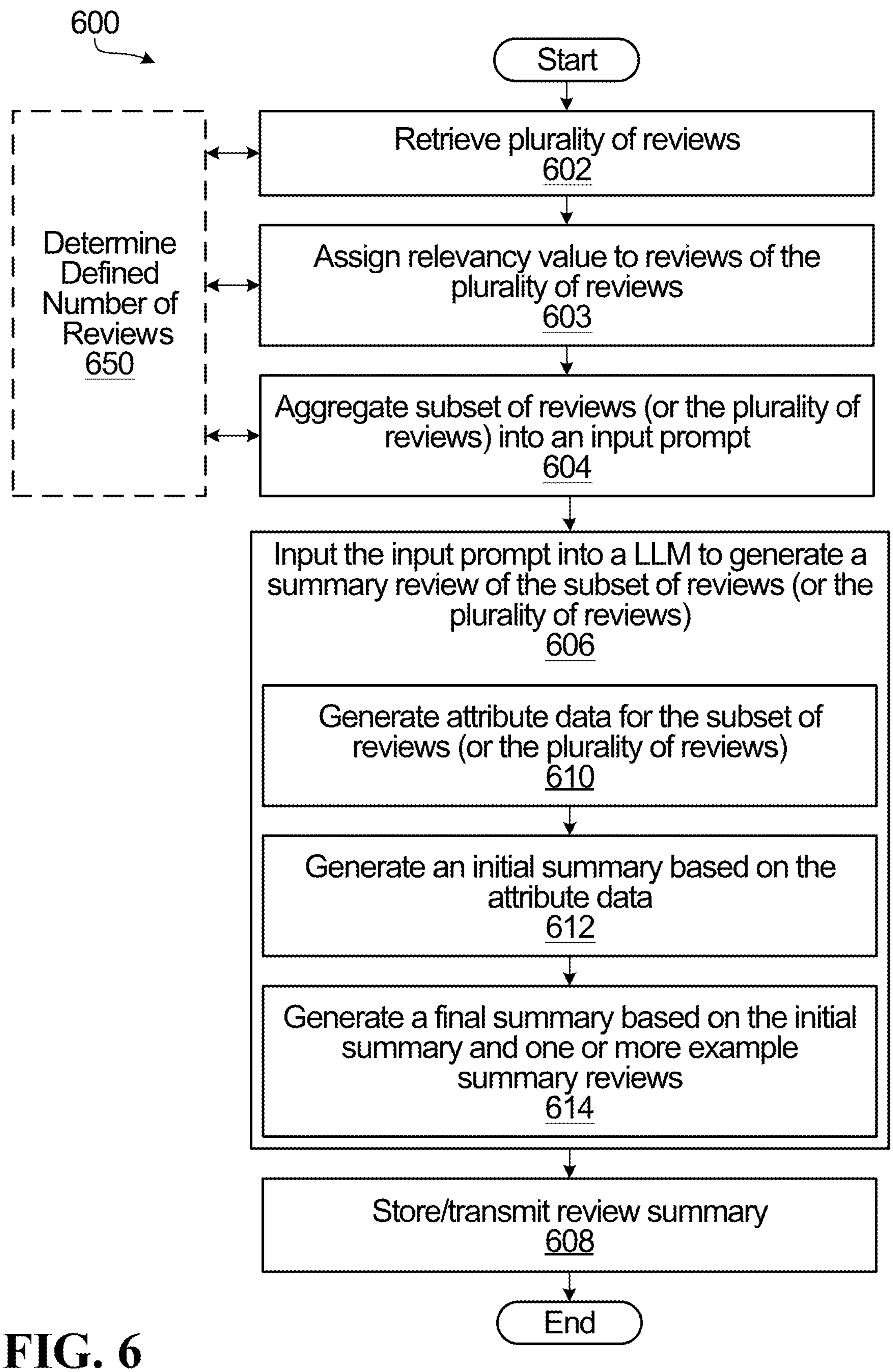

Start

Assign relevancy values to reviews of a
plurality of reviews
752

Aggregate subset of reviews from the plurality
of reviews, based on the relevancy value
assigned to the reviews of the plurality of
reviews, to generate an input prompt
754

Input the input prompt into a generative
language model yielding a summary review of
the subset of reviews generated by the
generative language model
756

End

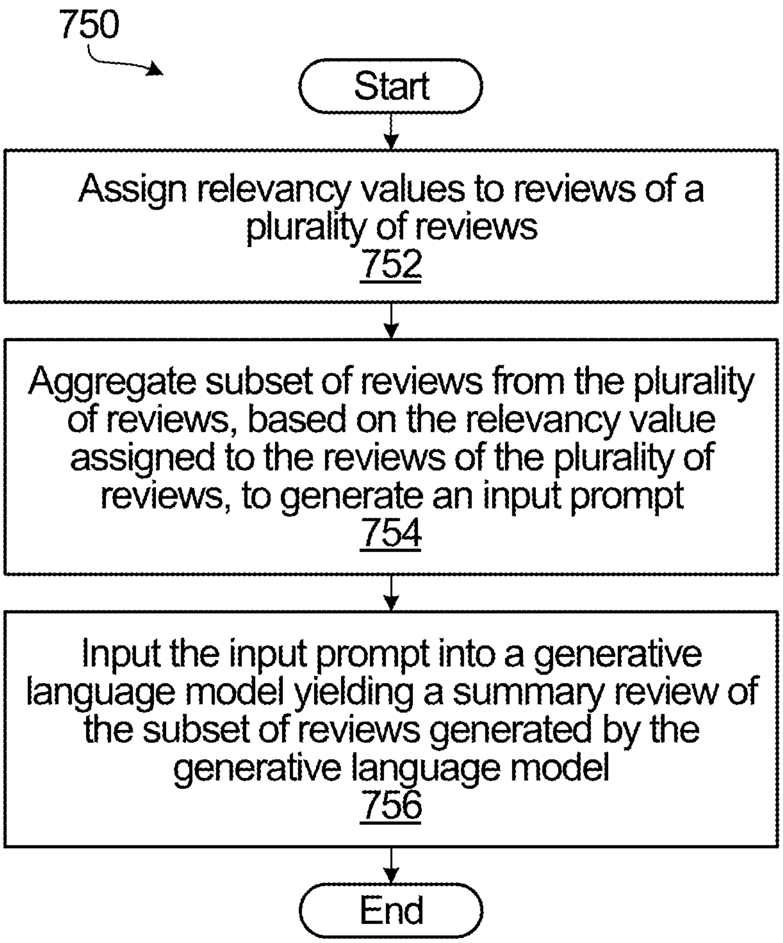

FIG. 9

SUMMARY OF REVIEWS GENERATED BY A GENERATIVE LANGUAGE MODEL

BACKGROUND

Generative language models may be large neural network predictive models which determine probabilities for a next word conditional on previous or historical words. Large language models (LLMs) are an example of a generative language model. LLMs may be responsive to input prompts including one or more of instructions, context and input data.

SUMMARY

Websites and other Internet content related to products and/or services may include reviews left by previous users regarding such products and services. These reviews can provide insight on the user experience with the product or service, including aspects the users enjoyed, issues the users experienced, and whether the users would recommend the product or service to others. Such reviews can be useful for providers of the product or service and potential future users of the product or server. However, a particular product or service may be reviewed hundreds or thousands of times by previous users. Additionally, when a particular product or service is updated, certain previous reviews may not be relevant for the updated version of the product or service. It may be impractical or inefficient for a provider or a potential future user to read every review.

In some embodiments herein, a generative language model, such as an LLM, may be used to generate a summary of reviews which can be provided to the provider or a potential future user. For example, the LLM may be responsive to an input prompt including instructions of "summarize the following reviews" and input data of an aggregation of reviews. However, there is often a limit to a number tokens which may form any single input prompt into a particular LLM known as an "input prompt limit". The expression "token" as used herein may be characters, words, portions of words, punctation, etc. and is described in greater detail below. This input prompt limit may be inherent technical limitation associated with an underlying size of a position embedding matrix or output size of certain transformation layers of that particular LLM. Accordingly, it may not be possible to insert every review for a particular product or service (or a particular category of products or services) into an input prompt for summarization thereof. Further, when a number of reviews aggregated into an input prompt increases, an amount of processing time and processing resources required by the LLM to summarize that input prompt may similarly increase. Further still, a quality of a summary generated by the LLM may not improve when a large number of reviews are aggregated into the input prompt, particularly as some reviews may be irrelevant, uninformative, or represent an insignificant variation from other reviews.

In some other embodiments herein, a summary server may assign relevancy values to different reviews of the plurality of reviews, and then select a subset of reviews to be aggregated into the input prompt based on the relevancy values assigned to the reviews. In some embodiments, the subset of reviews to be aggregated into the input prompt may be selected randomly without considering the relevancy values assigned to the reviews. Aggregating only a subset of reviews into the input prompt may be technically required in order to stay within the input prompt limit of a particular LLM. A further technical advantage of using only a subset of reviews as the input prompt is decreasing an amount of processing time and computing resources required by the LLM to yield a summary review based on the subset of reviews. A technical advantage of aggregating reviews having a high relevancy value is that a quality of a summary review generated by the LLM based on such reviews may be higher than a quality of a summary review generated based on all reviews, as only the most relevant reviews are included in the input prompt. Reviews having a low relevancy value may be irrelevant, uninformative, or represent an insignificant variation from other reviews, and their inclusion in the input prompt may result in a lower quality summary review generated by the LLM.

In other embodiments herein, the summary server may engineer the input prompt to better standardize the summary review generated by the LLM from the subset of reviews (or the plurality of reviews) and which can result in standardized output that can be more easily processed by subsequent processors. For example, the input prompt may include (a) instructions to generate attribute data of the subset of reviews (or the plurality of reviews), (b) instructions to generate an initial summary based on the attribute data, and (c) instructions to generate a final summary based on the initial summary and one or more example summary reviews. The input prompt stages and the instructions may be consistent for different subsets of reviews (or different pluralities of reviews). Consistent stages and instructions may allow the summary server to extract standardized attributes from the different subsets of reviews (or different pluralities of reviews) and to generate more standardized summary reviews with the LLM.

According to one embodiment, a computer-implemented method is provided. The computer-implemented method may include: assigning relevancy values to reviews of a plurality of reviews; aggregating a subset of reviews from the plurality of reviews into an input prompt, the subset of reviews selected based on the relevancy values assigned to reviews in the plurality of reviews; and inputting the input prompt into a generative language model yielding a summary review of the subset of reviews generated by the generative language model.

In some embodiments, the relevancy values assigned to a particular review of the plurality of reviews may be based on at least one of informational density of review content of the particular review or keywords in the review content of the particular review.

In some embodiments, the relevancy value assigned to a particular review of the plurality of reviews may be based on review metadata associated with the particular review.

In some embodiments, inputting the input prompt into the generative language model yielding the summary review may include: inputting the input prompt into the generative language model yielding attribute data associated with the subset of reviews generated by the generative language model; and inputting the attribute data into the generative language model yielding an initial summary generated by the generative language model.

In some embodiments, the computer-implemented method may further include inputting the initial summary and context including one or more example summary reviews into the generative language model yielding a final summary generated by the generative language model. The final summary may include the summary review.

In some embodiments, the subset of reviews may include reviews of the plurality of reviews having highest relevancy values.

In some embodiments, the subset of reviews may include a subset of reviews having a defined number of reviews, and the computer-implemented method may further include determining the defined number of reviews by generating a plurality of subsets of reviews. Each subset of reviews of the plurality of subsets of reviews may include a number of reviews selected according to a review number sequence and a subset of reviews in the review number sequence may include all reviews of a preceding subset of reviews in the review number sequence as well as additional reviews. The computer-implemented method may further include determining the defined number of reviews by, for each subset of reviews of the plurality of subsets of reviews: generating the summary review of the subset of reviews using the generative language model, and determining a distance between an embedding of the summary review of the subset of reviews and a corresponding embedding of a preceding summary review of the preceding subset of reviews. The computer-implemented method may further include determining the defined number of reviews by determining, as the defined number of reviews, a number of reviews in a particular subset of reviews of the plurality of subsets of reviews having the distance below a distance threshold.

In some embodiments, the preceding subset of reviews may include an immediately preceding subset of reviews in the review number sequence.

According to another embodiment, there is provided a non-transitory computer-readable storage medium having stored thereon computer-executable instructions that, when executed, may cause at least one processor to perform operations including: assigning relevancy values to reviews of a plurality of reviews; aggregating a subset of reviews from the plurality of reviews into an input prompt, the subset of reviews selected based on the relevancy values assigned to reviews in the plurality of reviews; and inputting the input prompt into a generative language model yielding a summary review of the subset of reviews generated by the generative language model.

In some embodiments, the relevancy values assigned to a particular review of the plurality of reviews may be based on at least one of: informational density of review content of the particular review; keywords in the review content of the particular review; or review metadata associated with the particular review.

In some embodiments, the computer-executable instructions which cause the at least one processor to perform operations including inputting the input prompt into the generative language model yielding the summary review may include instructions which cause the at least one processor to perform operations including: inputting the input prompt into the generative language model yielding attribute data associated with the subset of reviews generated by the generative language model; and inputting the attribute data into the generative language model yielding an initial summary generated by the generative language model.

In some embodiments, the non-transitory computer-readable storage medium may further include computer-executable instructions which cause the at least one processor to perform operations including inputting the initial summary and context including one or more example summary reviews into the generative language model yielding a final summary generated by the generative language model. The final summary may include the summary review.

In some embodiments, the subset of reviews may include reviews of the plurality of reviews having highest relevancy values.

In some embodiments, the subset of reviews may include a subset of reviews having a defined number of reviews, and may further include computer-executable instructions which cause the at least one processor to determine the defined number of reviews by performing operations including generating a plurality of subsets of reviews. Each subset of reviews of the plurality of subsets of reviews may include a number of reviews selected according to a review number sequence and a subset of reviews in the review number sequence may include all reviews of a preceding subset of reviews in the review number sequence as well as additional reviews. The non-transitory computer-readable storage medium may further include computer-executable instructions which cause the at least one processor to determine the defined number of reviews by performing operations including, for each subset of reviews of the plurality of subsets of reviews: generating the summary review of the subset of reviews using the generative language model, and determining a distance between an embedding of the summary review of the subset of reviews and a corresponding embedding of a preceding summary review of the preceding subset of reviews. The non-transitory computer-readable storage medium may further include computer-executable instructions which cause the at least one processor to determine the defined number of reviews by performing operations including determining, as the defined number of reviews, a number of reviews in a particular subset of reviews of the plurality of subsets of reviews having the distance below a distance threshold.

In some embodiments, the preceding subset of reviews may include an immediately preceding subset of reviews in the review number sequence.

According to another embodiment, a system is provided. The system may include at least one processor and a non-transitory computer-readable storage medium having stored thereon computer-executable instructions that, when executed, may cause the at least one processor to: assign relevancy values to reviews of a plurality of reviews; aggregate a subset of reviews from the plurality of reviews into an input prompt, the subset of reviews selected based on the relevancy values assigned to reviews in the plurality of reviews; and input the input prompt into a generative language model yielding a summary review of the subset of reviews generated by the generative language model.

In some embodiments, the relevancy values assigned to a particular review of the plurality of reviews may be based on at least one of: informational density of review content of that review; keywords in the review content of the particular review; or review metadata associated with that review.

In some embodiments, the computer-executable instructions which cause the at least one processor to perform operations including inputting the input prompt into the generative language model yielding the summary review may include instructions which cause the at least one processor to: input the input prompt into the generative language model yielding attribute data associated with the subset of reviews generated by the generative language model; input the attribute data into the generative language model yielding an initial summary generated by the generative language model; and input the initial summary and context including one or more example summary reviews into the generative language model yielding a final summary generated by the generative language model. The final summary may include the summary review.

In some embodiments, the subset of reviews may include reviews of the plurality of reviews having highest relevancy values.

In some embodiments, the subset of reviews may include a subset of reviews having a defined number of reviews, and the non-transitory computer-readable storage medium may further store computer-executable instructions which cause the at least one processor to determine the defined number of reviews by causing the at least one processor to generate a plurality of subsets of reviews. Each subset of reviews of the plurality of subsets of reviews may include a number of reviews selected according to a review number sequence and a subset of reviews in the review number sequence may include all reviews of a preceding subset of reviews in the review number sequence as well as additional reviews. The non-transitory computer-readable storage medium may further store computer-executable instructions which cause the at least one processor to determine the defined number of reviews by causing the at least one processor to, for each subset of reviews of the plurality of subsets of reviews: generate the summary review of the subset of reviews using the generative language model, and determine a distance between an embedding of the summary review of the subset of reviews and a corresponding embedding of a preceding summary review of the preceding subset of reviews. The non-transitory computer-readable storage medium may further store computer-executable instructions which cause the at least one processor to determine the defined number of reviews by causing the at least one processor to determine, as the defined number of reviews, a number of reviews of a particular subset of reviews of the plurality of subsets of reviews having the distance below a distance threshold.

Other aspects and features of the present disclosure will become apparent to those ordinarily skilled in the art upon review of the following description of specific embodiments of the disclosure in conjunction with the accompanying figures.

BRIEF DESCRIPTION OF DRAWINGS

Reference will now be made, by way of example, to the accompanying drawings which show example embodiments of the present application, and in which:

FIG. 6 is a flowchart of an generate summary review process performed at the summary server of FIG. 5 in accordance with one embodiment;

FIG. 9 is a flowchart of computer-implemented method for using a generative language model to generate a summary review based on an input prompt comprising a per subset of reviews and performed at the summary server of FIG. 5 in accordance with one embodiment;

DETAILED DESCRIPTION

Neural Networks and Machine Learning

Figure 1A:
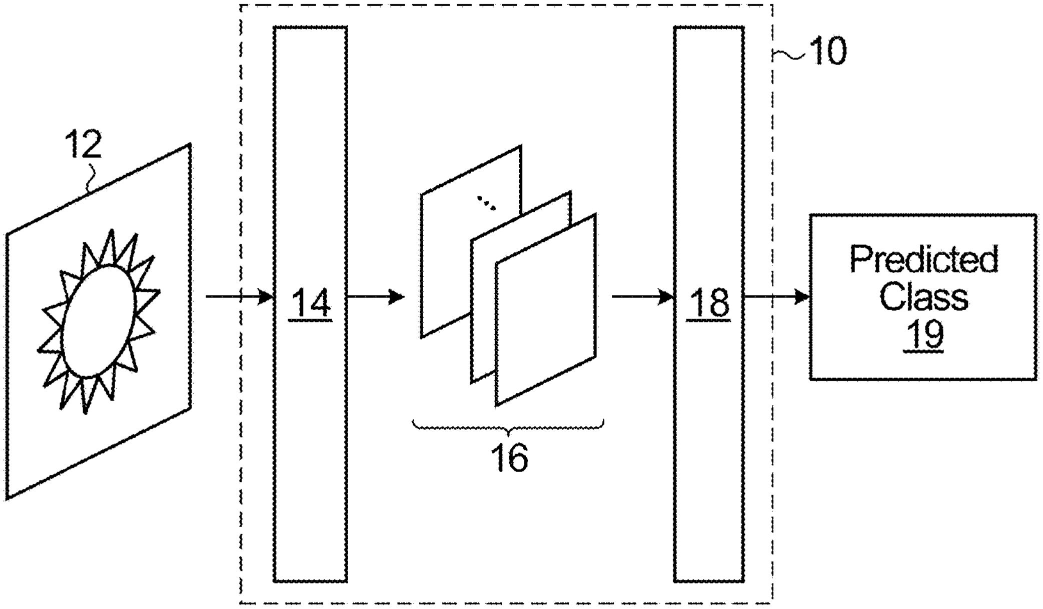
FIG. 1A is a block diagram of a simplified convolutional neural network, which may be used in examples of the present disclosure.

To assist in understanding the present disclosure, some concepts relevant to neural networks and machine learning (ML) are first discussed.

Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which need not be discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), and multilayer perceptrons (MLPs), among others.

DNNs are often used as ML-based models for modeling complex behaviors (e.g., human language, image recognition, object classification, etc.) in order to improve accuracy of outputs (e.g., more accurate predictions) such as, for example, as compared with models with fewer layers. In the present disclosure, the term "ML-based model" or more simply "ML model" may be understood to refer to a DNN. Training a ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model. For example, to train a ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. In another example, to train a ML model that is intended to classify images, the training dataset may be a collection of images. Training data may be annotated with ground truth labels (e.g., each data entry in the training dataset may be paired with a label), or may be unlabeled.

Training a ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or may be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training a ML model. Backpropagation is used to adjust (also referred to as update) the value of the parameters in the ML model, with the goal of optimizing the objective function. For example, a defined loss function is calculated by forward propagation of an input to obtain an output of the ML model and comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively, so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of a ML model typically involves further training the ML model on a number of data samples (which may be smaller in number/cardinality than those used to train the model initially) that closely target the specific task. For example, a ML model for generating natural language that has been trained generically on publicly-available text corpuses may be, e.g., fine-tuned by further training using the complete works of Shakespeare as training data samples (e.g., where the intended use of the ML model is generating a scene of a play or other textual content in the style of Shakespeare).

FIG. 1A is a simplified diagram of an example CNN 10, which is an example of a DNN that is commonly used for image processing tasks such as image classification, image analysis, object segmentation, etc. an input to the CNN 10 may be a 2D RGB image 12.

The CNN 10 includes a plurality of layers that process the image 12 in order to generate an output, such as a predicted classification or predicted label for the image 12. For simplicity, only a few layers of the CNN 10 are illustrated including at least one convolutional layer 14. The convolutional layer 14 performs convolution processing, which may involve computing a dot product between the input to the convolutional layer 14 and a convolution kernel. A convolutional kernel is typically a 2D matrix of learned parameters that is applied to the input in order to extract image features. Different convolutional kernels may be applied to extract different image information, such as shape information, color information, etc.

The output of the convolution layer 14 is a set of feature maps 16 (sometimes referred to as activation maps). Each feature map 16 generally has smaller width and height than the image 12. The set of feature maps 16 encode image features that may be processed by subsequent layers of the CNN 10, depending on the design and intended task for the CNN 10. In this example, a fully connected layer 18 processes the set of feature maps 16 in order to perform a classification of the image, based on the features encoded in the set of feature maps 16. The fully connected layer 18 contains learned parameters that, when applied to the set of feature maps 16, outputs a set of probabilities representing the likelihood that the image 12 belongs to each of a defined set of possible classes. The class having the highest probability may then be outputted as the predicted classification 19 for the image 12.

In general, a CNN may have different numbers and different types of layers, such as multiple convolution layers, max-pooling layers and/or a fully connected layer, among others. The parameters of the CNN may be learned through training, using data having ground truth labels specific to the desired task (e.g., class labels if the CNN is being trained for a classification task, pixel masks if the CNN is being trained for a segmentation task, text annotations if the CNN is being trained for a captioning task, etc.), as discussed above.

Some concepts in ML-based language models are now discussed. It may be noted that, while the term "language model" has been commonly used to refer to a ML-based language model, there could exist non-ML language models. In the present disclosure, the term "language model" may be used as shorthand for ML-based language model (i.e., a language model that is implemented using a neural network or other ML architecture), unless stated otherwise. For example, unless stated otherwise, "language model" encompasses LLMs.

A language model may use a neural network (typically a DNN) to perform natural language processing (NLP) tasks such as language translation, image captioning, grammatical error correction, and language generation, among others. A language model may be trained to model how words relate to each other in a textual sequence, based on probabilities. A language model may contain hundreds of thousands of learned parameters or in the case of a large language model (LLM) may contain millions or billions of learned parameters or more.

In recent years, there has been interest in a type of neural network architecture, referred to as a transformer, for use as language models. For example, the Bidirectional Encoder Representations from Transformers (BERT) model, the Transformer-XL model and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

Figure 1B:
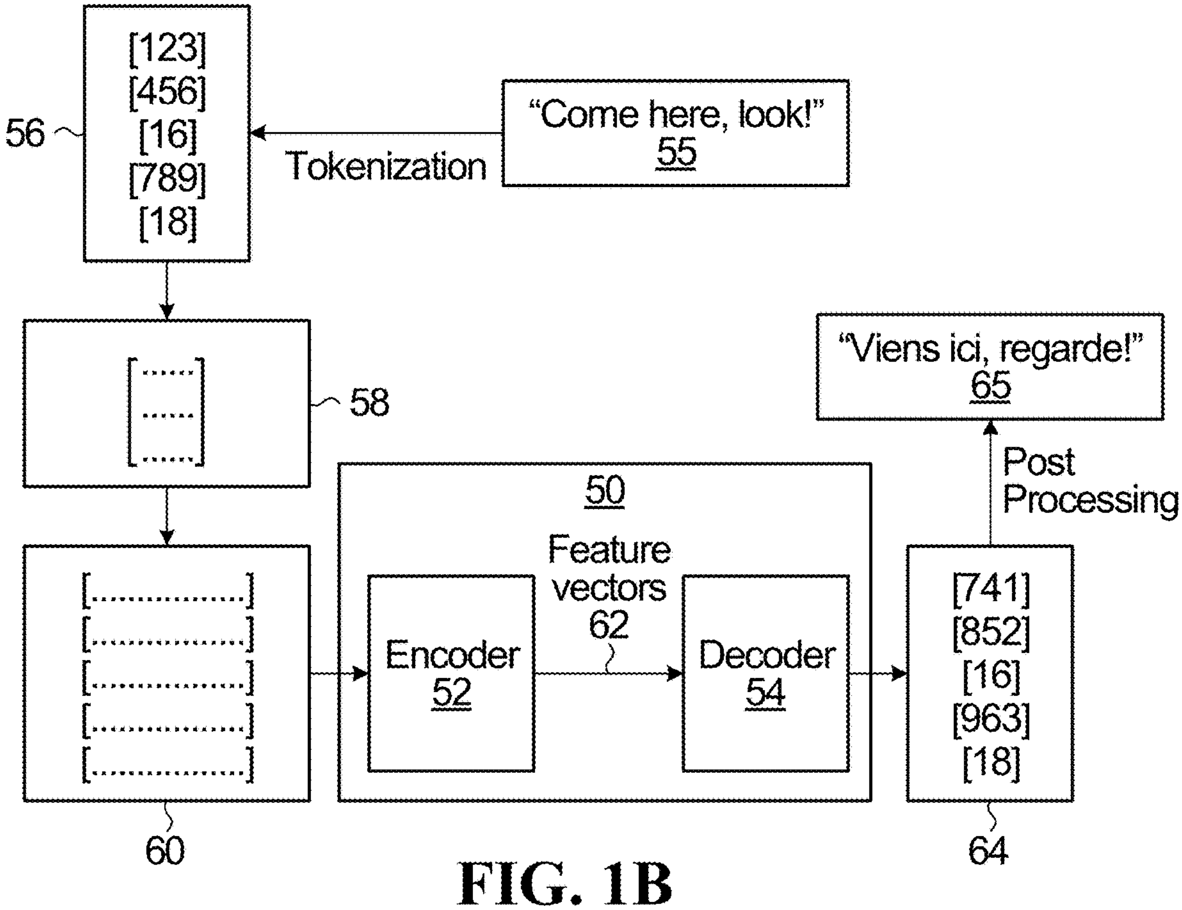
FIG. 1B is a block diagram of a simplified transformer neural network, which may be used in examples of the present disclosure.

FIG. 1B is a simplified diagram of an example transformer 50, and a simplified discussion of its operation is now provided. The transformer 50 includes an encoder 52 (which may comprise one or more encoder layers/blocks connected in series) and a decoder 54 (which may comprise one or more decoder layers/blocks connected in series). Generally, the encoder 52 and the decoder 54 each include a plurality of neural network layers, at least one of which may be a self-attention layer. The parameters of the neural network layers may be referred to as the parameters of the language model.

The transformer 50 may be trained on a text corpus that is labelled (e.g., annotated to indicate verbs, nouns, etc.) or unlabeled. LLMs may be trained on a large unlabeled corpus. Some LLMs may be trained on a large multi-language, multi-domain corpus, to enable the model to be versatile at a variety of language-based tasks such as generative tasks (e.g., generating human-like natural language responses to natural language input).

An example of how the transformer 50 may process textual input data is now described. Input to a language model (whether transformer-based or otherwise) typically is in the form of natural language as may be parsed into tokens. It should be appreciated that the term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph, etc.) into a sequence of shorter segments that are converted to numerical representations referred to as tokens (or "compute tokens"). Typically, a token may be an integer that corresponds to the index of a text segment (e.g., a word) in a vocabulary dataset. Often, the vocabulary dataset is arranged by frequency of use. Commonly occurring text, such as punctuation, may have a lower vocabulary index in the dataset and thus be represented by a token having a smaller integer value than less commonly occurring text. Tokens frequently correspond to words, with or without whitespace appended. In some examples, a token may correspond to a portion of a word. For example, the word "lower" may be represented by a token for [low] and a second token for [er]. In another example, the text sequence "Come here, look!" may be parsed into the segments [Come], [here], [,], [look] and [!], each of which may be represented by a respective numerical token. In addition to tokens that are parsed from the textual sequence (e.g., tokens that correspond to words and punctuation), there may also be special tokens to encode non-textual information. For example, a [CLASS] token may be a special token that corresponds to a classification of the textual sequence (e.g., may classify the textual sequence as a poem, a list, a paragraph, etc.), a [EOT] token may be another special token that indicates the end of the textual sequence, other tokens may provide formatting information, etc.

In FIG. 1B, a short sequence of tokens 56 corresponding to the text sequence "Come here, look!" 55 is illustrated as input to the transformer 50. Tokenization of the text sequence into the tokens 56 may be performed by some pre-processing tokenization module such as, for example, a byte pair encoding tokenizer (the "pre" referring to the tokenization occurring prior to the processing of the tokenized input by the LLM), which is not shown in FIG. 1B for simplicity. In general, the token sequence that is inputted to the transformer 50 may be of any length up to a maximum length defined based on the dimensions of the transformer 50 (e.g., such a limit may be 2048 tokens in some LLMs). Each token 56 in the token sequence is converted into an embedding vector 60 (also referred to simply as an embedding). An embedding 60 is a learned numerical representation (such as, for example, a vector) of a token that captures some semantic meaning of the text segment represented by the token 56. The embedding 60 represents the text segment corresponding to the token 56 in a way such that embeddings corresponding to semantically-related text are closer to each other in a vector space than embeddings corresponding to semantically-unrelated text. For example, assuming that the words "look", "see", and "cake" each correspond to, respectively, a "look" token, a "see" token, and a "cake" token when tokenized, the embedding 60 corresponding to the "look" token will be closer to another embedding corresponding to the "see" token in the vector space, as compared to the distance between the embedding 60 corresponding to the "look" token and another embedding corresponding to the "cake" token. The vector space may be defined by the dimensions and values of the embedding vectors. Various techniques may be used to convert a token 56 to an embedding 60. For example, another trained ML model may be used to convert the token 56 into an embedding 60. In particular, another trained ML model may be used to convert the token 56 into an embedding 60 in a way that encodes additional information into the embedding 60 (e.g., a trained ML model may encode positional information about the position of the token 56 in the text sequence into the embedding 60). In some examples, the numerical value of the token 56 may be used to look up the corresponding embedding in an embedding matrix 58 (which may be learned during training of the transformer 50).

The generated embeddings 60 are input into the encoder 52. The encoder 52 serves to encode the embeddings 60 into feature vectors 62 that represent the latent features of the embeddings 60. The encoder 52 may encode positional information (i.e., information about the sequence of the input) in the feature vectors 62. The feature vectors 62 may have very high dimensionality (e.g., on the order of thousands or tens of thousands), with each element in a feature vector 62 corresponding to a respective feature. The numerical weight of each element in a feature vector 62 represents the importance of the corresponding feature. The space of all possible feature vectors 62 that can be generated by the encoder 52 may be referred to as the latent space or feature space.

Conceptually, the decoder 54 is designed to map the features represented by the feature vectors 62 into meaningful output, which may depend on the task that was assigned to the transformer 50. For example, if the transformer 50 is used for a translation task, the decoder 54 may map the feature vectors 62 into text output in a target language different from the language of the original tokens 56. Generally, in a generative language model, the decoder 54 serves to decode the feature vectors 62 into a sequence of tokens. The decoder 54 may generate output tokens 64 one by one. Each output token 64 may be fed back as input to the decoder 54 in order to generate the next output token 64. By feeding back the generated output and applying self-attention, the decoder 54 is able to generate a sequence of output tokens 64 that has sequential meaning (e.g., the resulting output text sequence is understandable as a sentence and obeys grammatical rules). The decoder 54 may generate output tokens 64 until a special [EOT] token (indicating the end of the text) is generated. The resulting sequence of output tokens 64 may then be converted to a text sequence in post-processing. For example, each output token 64 may be an integer number that corresponds to a vocabulary index. By looking up the text segment using the vocabulary index, the text segment corresponding to each output token 64 can be retrieved, the text segments can be concatenated together and the final output text sequence (in this example, "Viens ici, regarde!" 65) can be obtained.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that may be considered to be an encoder-only language model. A decoder-only language model accepts embeddings as input and may use auto-regression to generate an output text sequence. Transformer-XL and GPT-type models may be language models that are considered to be decoder-only language models.

Because GPT-type language models tend to have a large number of parameters, these language models may be considered LLMs. An example GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2048 input tokens), and is able to generate a large number of tokens as output (e.g., up to 2048 tokens). GPT-3 has been trained as a generative model, meaning that it can process input text sequences to predictively generate a meaningful output text sequence. ChatGPT is built on top of a GPT-type LLM, and has been fine-tuned with training datasets based on text-based chats (e.g., chatbot conversations). ChatGPT is designed for processing natural language, receiving chat-like inputs and generating chat-like outputs.

A computing system may access a remote language model (e.g., a cloud-based language model), such as ChatGPT or GPT-3, via a software interface (e.g., an application programming interface (API)). Additionally or alternatively, such a remote language model may be accessed via a network such as, for example, the Internet. In some implementations such as, for example, potentially in the case of a cloud-based language model, a remote language model may be hosted by a computer system as may include a plurality of cooperating (e.g., cooperating via a network) computer systems such as may be in, for example, a distributed arrangement. Notably, a remote language model may employ a plurality of processors (e.g., hardware processors such as, for example, processors of cooperating computer systems). Indeed, processing of inputs by an LLM may be computationally expensive/may involve a large number of operations (e.g., many instructions may be executed/large data structures may be accessed from memory) and providing output in a required timeframe (e.g., real-time or near real-time) may require the use of a plurality of processors/cooperating computing devices as discussed above.

Inputs to an LLM may be referred to as a prompt, which is a natural language input that includes instructions to the LLM to generate a desired output. A computing system may generate a prompt that is provided as input to the LLM via its API. As described above, the prompt may optionally be processed or pre-processed into a token sequence prior to being provided as input to the LLM via its API. A prompt can include one or more examples of the desired output, which provides the LLM with additional information to enable the LLM to better generate output according to the desired output. Additionally or alternatively, the examples included in a prompt may provide inputs (e.g., example inputs) corresponding to/as may be expected to result in the desired outputs provided. A one-shot prompt refers to a prompt that includes one example, and a few-shot prompt refers to a prompt that includes multiple examples. A prompt that includes no examples may be referred to as a zero-shot prompt.

Figure 2:
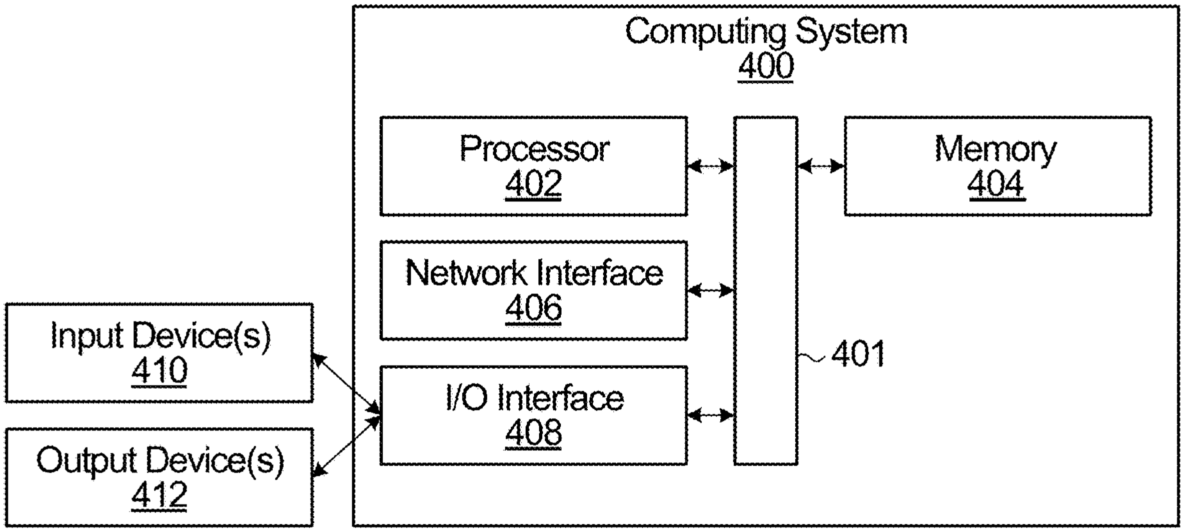
FIG. 2 is a block diagram of an example computing system, which may be used to implement examples of the present disclosure.

FIG. 2 illustrates an example computing system 400, which may be used to implement examples of the present disclosure, such as a prompt generation engine to generate prompts to be provided as input to a language model such as an LLM. Additionally or alternatively, one or more instances of the example computing system 400 may be employed to execute the LLM. For example, a plurality of instances of the example computing system 400 may cooperate to provide output using an LLM in manners as discussed above.

The example computing system 400 includes at least one processing unit, such as a processor 402, and at least one physical memory 404. The processor 402 may be, for example, a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 404 may include a volatile or non-volatile memory (e.g., a flash memory, a random access memory (RAM), and/or a read-only memory (ROM)). The memory 404 may store instructions for execution by the processor 402, to the computing system 400 to carry out examples of the methods, functionalities, systems and modules disclosed herein.

The computing system 400 may also include at least one network interface 406 for wired and/or wireless communications with an external system and/or network (e.g., an intranet, the Internet, a P2P network, a WAN and/or a LAN). A network interface may enable the computing system 400 to carry out communications (e.g., wireless communications) with systems external to the computing system 400, such as a language model residing on a remote system.

The computing system 400 may optionally include at least one input/output (I/O) interface 408, which may interface with optional input device(s) 410 and/or optional output device(s) 412. Input device(s) 410 may include, for example, buttons, a microphone, a touchscreen, a keyboard, etc. Output device(s) 412 may include, for example, a display, a speaker, etc. In this example, optional input device(s) 410 and optional output device(s) 412 are shown external to the computing system 400. In other examples, one or more of the input device(s) 410 and/or output device(s) 412 may be an internal component of the computing system 400.

A computing system, such as the computing system 400 of FIG. 2, may access a remote system (e.g., a cloud-based system) to communicate with a remote language model or LLM hosted on the remote system such as, for example, using an application programming interface (API) call. The API call may include an API key to enable the computing system to be identified by the remote system. The API call may also include an identification of the language model or LLM to be accessed and/or parameters for adjusting outputs generated by the language model or LLM, such as, for example, one or more of a temperature parameter (which may control the amount of randomness or "creativity" of the generated output) (and/or, more generally some form of random seed as serves to introduce variability or variety into the output of the LLM), a minimum length of the output (e.g., a minimum of 10 tokens) and/or a maximum length of the output (e.g., a maximum of 1000 tokens), a frequency penalty parameter (e.g., a parameter which may lower the likelihood of subsequently outputting a word based on the number of times that word has already been output), a "best of" parameter (e.g., a parameter to control the number of times the model will use to generate output after being instructed to, e.g., produce several outputs based on slightly varied inputs). The prompt generated by the computing system is provided to the language model or LLM and the output (e.g., token sequence) generated by the language model or LLM is communicated back to the computing system. In other examples, the prompt may be provided directly to the language model or LLM without requiring an API call. For example, the prompt could be sent to a remote LLM via a network such as, for example, as or in message (e.g., in a payload of a message).

Embodiments herein relate to a generative language model, such as an LLM (e.g., an LLM as described above), to receive an input prompt that includes a plurality of event messages possibly received from different computer systems, and to generate an aggregation notification message therefrom. The embodiments described below are presented in the context of a software platform in e-commerce. However, the methods and systems are not limited to e-commerce and are instead applicable to any software platform in which one or more computer systems provide services to a user and respond to one or more events occurring in the computer system by generating event messages.

Software platform 500

For illustrative purposes, in some of the embodiments below, examples are presented in the context of an e-commerce platform where products and/or services are provided to a user. However, the methods and systems disclosed herein are applicable to any system in which users leaves reviews for products or services or leaves reviews for any type of content provided by another entity.

Figure 3:
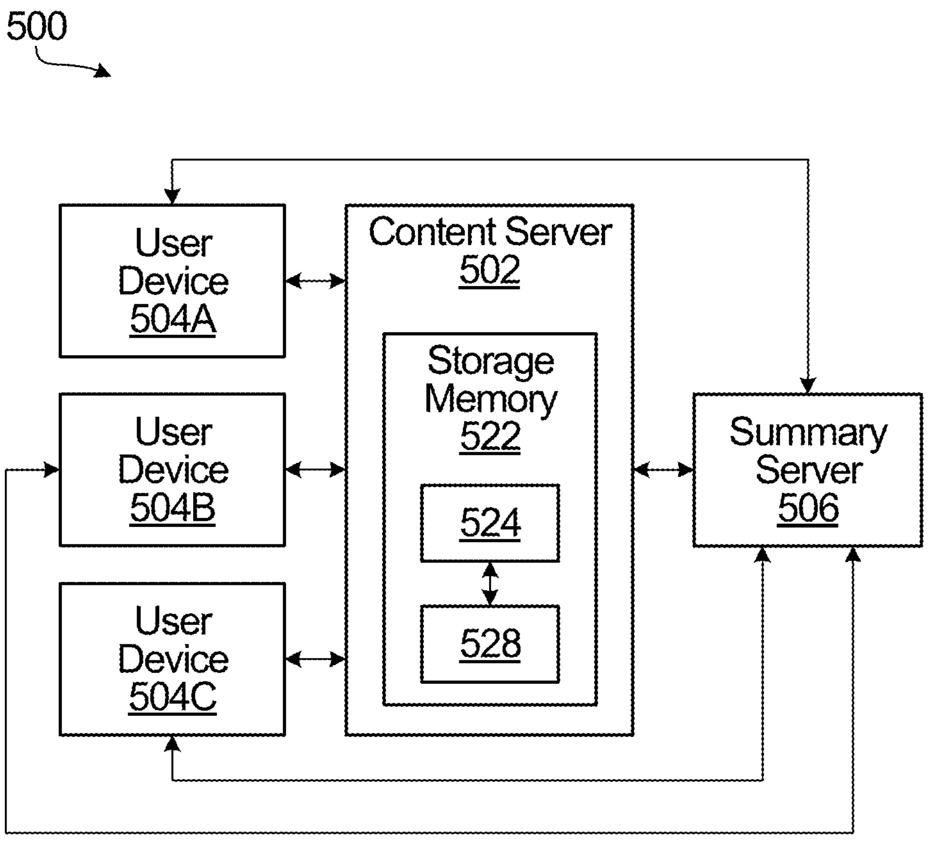
FIG. 3 is a block diagram of a software platform in accordance with one embodiment.

Referring to FIG. 3, a block diagram illustrating a software platform for providing products and/or services in accordance with one embodiment is shown generally at 500. The software platform 500 includes a content server 502, a plurality of user devices 504A-504C, and summary server 506. The content server 502 and the summary server 506 may comprise any computer or program that provides communicates with other computers, programs, or user devices, either in the same computer or over a network such as the internet. As non-limiting examples, the content server 502 and the summary server 506 may be application, communication, mail, database, proxy, fax, file, media, web, peer-to-peer, standalone, software, or hardware servers (i.e., server computers) and may use any server format known to one of ordinary skill in the art.

The content server 502 may host or store content associated with products or services provided by a single provider or by multiple providers. In the embodiment shown in FIG. 3, only a single content server 502 is shown; in other embodiments, more than one content server 502 may be used to host content provided by the single provider or by the multiple providers. The expression "content" includes any information which can be made available electronically to the plurality of user devices 504A-504C and may include websites, webapps, computer applications, mobile applications, multimedia content such as image data, audio data and video data, etc. The expression "products" as used herein refers to any good, article, substance, or information which may be provided to users (e.g., for a cost or for no cost). For example, the product may be an electronic product (e.g., a software application, an electronic book, access to electronic video or audio content) which is delivered electronically to a particular user device 504 of the plurality of user devices 504A-504C or may be a physical product which is physically shipped to an address associated with a user of the user device 504. The expression "service" as used herein refers to any action, access or use which may be provided to users (e.g., for cost or for no cost). For example, the service may be an electronic service (e.g., a subscription to a software application, online assistance, etc.) which is provided electronically to a particular user device 504 or may be a physical service which is physically provided to the address associated with the user of the particular user device 504.

The content associated with products or services provided by the content server 502 may include a description of the product or service (e.g., text description, image description, video description, etc.), an option to obtain the product or service (e.g., install, purchase, subscribe), and a plurality of reviews left by previous users of the product or service. The expression "review" as used herein refers to any comments, assessments, evaluations and/or summaries provided by a user related to the product or service. A particular review may include review content and review metadata. The review content may include the actual comments, assessments, evaluations and/or summaries left by the user. The review content may describe the user experience with the product or service, aspects of the product or service that the user enjoyed, issues with the product or service that the user experienced, and whether the user would recommend the product or service to others. The review content may be in text format, image format or video format. The review metadata may include additional information associated with the review, including without limitation a rating associated with the review, a user account associated with review, an age of the user account, a flag status of the user account, a time and/or date of the review, a flag status associated with the review, etc. A flag status associated with a user account may indicate that the user account entry is a normal account, a duplicate account, a disabled account, a trusted account, an untrusted account, etc. A flag status associated with a review may indicate that the review entry is a normal review, a machine-generated review, a fake review, a duplicate review, etc.6

The description of a particular product or service and the plurality of reviews for that particular product or service may be stored by the content server 502 in association with that particular product or service. For example, referring to FIG. 5, the content server 502 may include a storage memory 522 storing a relational datastore including a product or service datastore 524 and a review datastore 528. A product or service entry in the product or service datastore 524 may be associated with one or more review entries in the review datastore 528. In other embodiments, the relational datastore may include additional, fewer, or alternative datastores, including a user datastore (not shown).

In some embodiments, the same content provided by the content server 502 (e.g., a same webpage, a same webapp, a same piece of multi-media content, etc.) may be associated with different versions of a particular product or service, such as previous versions of a particular product or service and a current version of that product or service. For example, a product or service entry for a particular product may still be associated with a same identifier in the product or service datastore 524 when the product or service is updated or modified by the provider of the product or service, but may be updated with an updated description field similarly updated or modified by the provider. In other embodiments, different versions of a particular product or service may be associated with different content provided by the content server 502 (e.g., a different webpage, a different web app, a different piece of multi-media content, etc.).

Further, in some embodiments, the review content and the review metadata associated with a particular review of the plurality reviews may also be stored in association with the review entry in the review datastore 528. For example, a particular review entry may include fields associated with content (including the text and/or image forming the review content), a created date, modified date, status for example. As an additional example, a particular review entry in the review datastore 528 may be associated with a user entry in a user table (not shown), and the user entry may include fields associated with a created date, modified date, and a status for example. In some embodiments, a particular review may be associated with a single user, but a particular user may be associated with numerous reviews (e.g., the relationship of reviews to users may be n:1).

Figure 4:
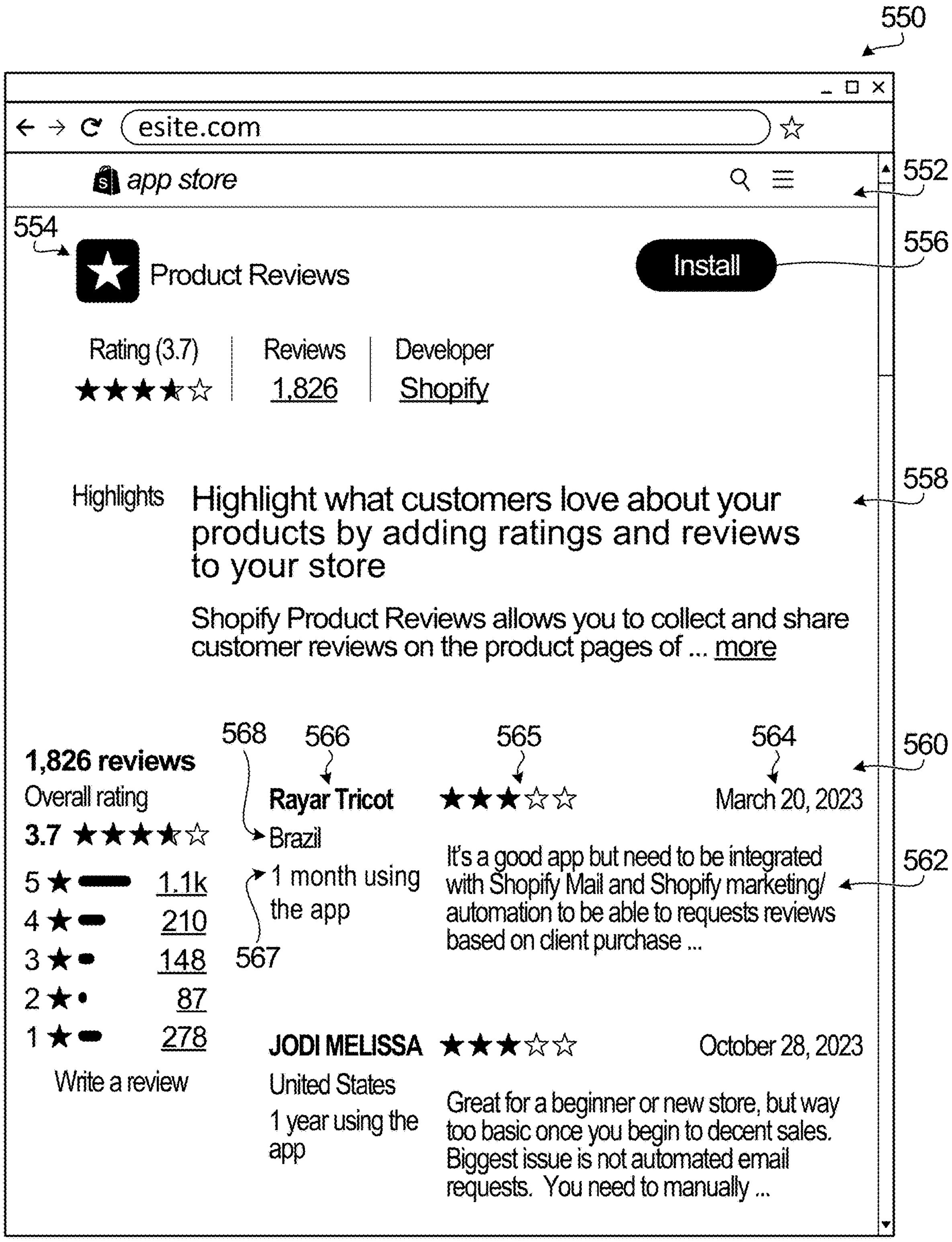
FIG. 4 is an example of content hosted by the content system of FIG. 3 in accordance with one embodiment.

Referring now to FIG. 4, an example of content associated with a particular product or service which will be hosted by the content server 502 is generally shown at 550. In embodiment shown, the content 550 is a webpage 552 associated with a software application 554. The webpage 552 includes an install button 556 which may enable a user associated with a particular user device 504 to obtain the software application 554. For example, selecting the install button 556 may cause (or lead to another piece of content for causing) electronic transmission of a data package including the software application 554 from the content server 502 to the user device 504. In the embodiment shown, the webpage 552 further includes a product description 558 and a plurality of reviews 560. The product description 558 may include data from a description field of the product or service entry from the product or service datastore 524 and may generally describe the software application 554, including features, functionality and benefits of the software application 554 for example. The plurality of reviews 560 may include information from review entries from the review datastore 528 and may generally include reviews of the software application 554 left by previous users. Each review of the plurality of reviews 560 includes at least (1) review content 562 comprising comments left by previous users and (2) review metadata comprising a review date 564, a review rating 565, a user account 566 associated with the review, a time duration 567 that the user account 566 has used the software application 554, and a geographic location 568 of the user associated with the user account 566.

However, a particular product or service may be reviewed hundreds or thousands of times by previous users, and a particular product or service entry in the product or service datastore 524 may be associated with hundreds or thousands of review entries of the review datastore 528. It may be impractical or inefficient for the provider of the product or service or a potential future user of the product or service to read every review. In this regard, referring back to FIG. 3, the summary server 506 in communication with the content server 502 and/or the plurality of user devices 504A-504C and which may use a generative language model, such as an LLM described above, to generate a summary review for a particular product or service (e.g., the software application 554 shown in FIG. 4) based on an input prompt with input data including different reviews of the plurality of reviews (e.g., the plurality of reviews 560 shown in FIG. 4) associated with the particular product or service.

In some embodiments, the plurality of reviews may be retrieved from the content server 502. For example, the review content and the review metadata associated with different reviews may both be retrieved from the review datastore 528 stored in the storage memory 522 for example. In other embodiments, the plurality of reviews may also be extracted from external sources, such as external content not hosted by the content server 502, external websites, external web applications, external multimedia content, etc. In such embodiments, the review content and the review metadata may be extracted from the external content, such as by scraping or harvesting data from external websites or external applications using a variety of different technologies, including HTTP requests, image-based extractions, etc.

Summary Server 506

In some embodiments, the summary server 506 is similar to the example computing system 400 described above.

Figure 5:
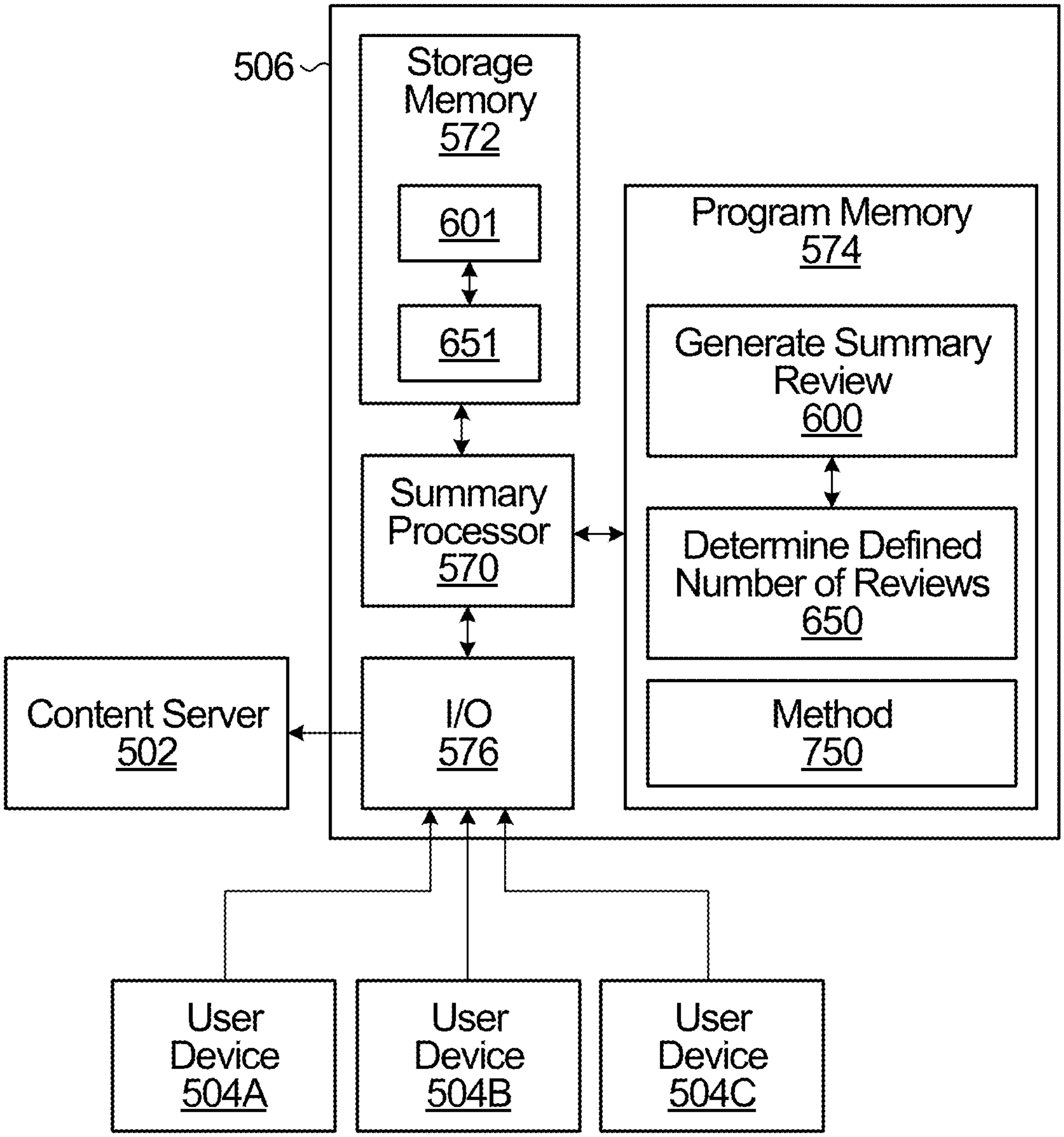
FIG. 5 is a schematic of a summary server of the software platform of FIG. 1 in accordance with one embodiment.

Another embodiment of the summary server 506 is shown in FIG. 5; in this embodiment shown, the summary server 506 includes at least one summary processor 570, and a storage memory 572, a program memory 574 and an input/output (I/O) interface 576 all in communication with the summary processor 570. Other embodiments of the summary server 506 may include fewer, additional or alternative components. Additionally, although only a single summary processor 570, a single storage memory 572, a single program memory 574, and a single I/O interface 576 is shown in FIG. 5, other embodiments of the summary server 506 may include more than one of each of these components.

The storage memory 572 stores information received or generated by the summary processor 570 and may generally function as an information or datastore. In the embodiment shown, the storage memory 572 includes a summary review datastore 601 and a defined number datastore 651; in other embodiments, the storage memory 572 may include fewer, additional or alternative datastores. The program memory 574 stores various blocks of code (alternatively called processor, machine and/or computer executable instructions), including codes for directing the summary processor 570 to perform various processes, such as a generate summary review process 600, a determine defined number of reviews process 65 and a method 750 as described below. The program memory 574 may also store database management system codes for managing the datastores in the storage memory 572. In other embodiments, the program memory 574 may store fewer, additional or alternative codes for directing the summary processor 570 to execute additional or alternative functions. The storage memory 572 and the program memory 574 may each be implemented as one or a combination of a non-transitory computer-readable and/or non-transitory machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching thereof). The expression "non-transitory computer-readable medium" or "non-transitory machine-readable medium" as used herein is defined to include any type of computer-readable storage device and/or storage disk and to exclude propagating signals and to exclude transmission media.

The I/O interface 576 comprises an interface for receiving and transmitting information between the summary server 506 and different systems within the software platform 500, including the content server 502 and the plurality of user devices 504A-504C. For example, the summary server 506 may receive the plurality of reviews (including respective review content and review metadata associated with each review of the plurality reviews) transmitted from the content server 502 or an external source over a network (such as a wireless network or a wired network) via the I/O interface 576. As an additional non-limiting example, the content server 502 may transmit the review summary generated based on the plurality of reviews to the content server 502 and/or the plurality of user devices 504A-504C via the I/O interface 576. As a further non-nonlimiting example, the summary server 506 also communicate with additional systems over the I/O interface 576, including an external model server (not shown) described below. Such an external model server may have increased processing capacity and computing resources for training and/or fine-tuning various machine learning models, including the generative language models described herein. The I/O interface 576 may include any communication interface which enables the summary processor 570 to communicate with external components, including specialized or standard I/O interface technologies such as channel, port-mapped, asynchronous for example. In some embodiments, the I/O interface 576 may be implemented using a network interface card (NIC), a port, and/or a network socket.

The summary processor 570 is configured to execute codes stored in the program memory 574, to retrieve information from and store information into the datastores of the storage memory 572, and to receive and transmit information to the content server 502 and the plurality of user devices 504A-504C over the I/O interface 576, examples of which are described below. In the embodiment shown, the summary processor 570 is a server central processing unit and may be a multi-core processor.

Generate Summary Review Process 600

Referring to FIGS. 5 and 6, a computer-implemented generate summary review process for utilizing a generative language model, such as the LLMs described above, to generate a summary review based on an input prompt comprising a plurality of reviews is generally shown at 600. The input prompt may comprise an aggregation of a plurality of reviews received from the content server 502 or extracted from an external source. Integration of a generative language model may automate and standardize summarization of the plurality of reviews via machine-generated text. This can have technical advantages including a higher degree of quality, reliability, and standardization of machine-generated summary reviews. Additionally, in some embodiments, resulting summary reviews comprising machine-generated text that is based on both vast amounts of previously learned text and the plurality of reviews may result in standardized output that can be more easily processed by subsequent processors (e.g., such as processors implemented by the provider of the product or service and/or processors of the content server 502 for example) and/or more easily parsed and searched for by potential future users of the product or service.

In the embodiment shown, the generate summary review process 600 is performed by the summary processor 570 executing processor, machine and/or computer readable instructions stored in the program memory 574; in other embodiments, the generate summary review process 600 may comprise processor, machine and/or computer readable instructions alternatively stored on other non-transitory computer readable storage medium; in yet other embodiments, the generate summary review process 600 and/or parts thereof could alternatively be executed by a device other than the summary processor 570, including for example, by the external model server. Further, although the generate summary review process 600 in accordance with one embodiment is described with reference to the flowchart illustrated in FIG. 5, other methods of implementing the generate summary review process 600 may alternatively be used. For example, the order of execution of the blocks may be altered, and/or some of the blocks described may be altered, eliminated, or combined.

In the embodiment shown in FIG. 6, the generate summary review process 600 begins at block 602, which may include codes causing the summary processor 570 to retrieve a plurality of reviews. In some embodiments, the summary processor 570 may retrieve the plurality of reviews as a plurality of review entries (e.g., including the review content and the review metadata associated with each review) from the review datastore 528 in the storage memory 522. Alternatively, in other embodiments, the summary processor 570 may extract the plurality of reviews (e.g., again including the review content and the review metadata associated with each review) from external sources, including external content not hosted by the content server 502, external websites, external web applications, external multimedia content, etc., as described above. As described above, the review content of each review may be in text format, image format or video format. As also described above, the review metadata may include additional information associated with the review, including without limitation the user account associated with review, the age of the user account, the flag status of the user account, the time and/or date of the review, the flag status of the review, etc.

In some embodiments, the plurality of reviews retrieved by the summary processor 570 at block 602 may comprise a plurality of reviews associated with a single product or service. For example, in embodiments where the plurality of reviews comprise review entries retrieved by from the review datastore 528, the retrieved review entries may comprise review entries associated with a same product or service identifier (which may identify an entry from the product or service datastore 524). As an additional example, in embodiments where the plurality of reviews comprise a reviews extracted from an external source, the extracted reviews may comprise reviews extracted from a same piece of external content (e.g., a same webpage, a same web application, a same piece of multimedia content, etc.). In other embodiments, the plurality of reviews retrieved at block 602 may comprise a plurality of reviews associated with a more than one product or service, such as products or services from a category of product or service (e.g., software applications, books, pet food, cleaning products, furniture, musical instruments etc.) and/or a plurality of related products or services (e.g., physical books, electronic books and audiobooks; video streaming subscription services and game subscription services, etc.). For example, in embodiments where the plurality of reviews comprise review entries retrieved from the review datastore 528, the retrieved review entries may be associated with more than one product or service identifier and/or one or more category identifiers. As an additional example, in embodiments where the plurality of reviews comprise reviews extracted from an external source, the extracted reviews may comprise reviews extracted from more than one piece of external content (such as different webpages provided by a same external source, different webpages falling within a particular category, etc.). In yet other embodiments, the plurality of reviews retrieved at block 602 may comprise all possible reviews from a particular source. For example, in embodiments where the plurality of reviews comprise review entries retrieved from the review datastore 528, the retrieved review entries may comprise every review entry in the review datastore 528. As an additional example, in embodiments where the plurality of reviews comprise reviews extracted from an external source, the extracted reviews may comprise all reviews extracted from all content hosted by a particular e-commerce platform.

The generate summary review process 600 then continues to block 603 which may include codes that cause the summary processor 570 to assign relevancy values for each review of the plurality of reviews retrieved at block 602. The relevancy value associated with a particular review of the plurality of reviews may be based on the review content associated with that particular review, such as an informational density of the review content or occurrence of key-words within the review content. Additionally or alternatively, the relevancy value associated with a particular review may also be based on review metadata associated with that review, including the age of the user account leaving the review, the flag status of the user account, a recency of the review, the flag status of the review etc.

For example, in embodiments where the relevancy value of a review is based on an informational density of the review content associated with that review, block 603 may cause the summary processor 570 to generate a tf-idf (term frequency-inverse document frequency) value for the review content of each review within the plurality of reviews. For example, the plurality of reviews retrieved at block 602 may form a "review corpus". The tf value for a particular word may be based a number of instances of the word in the review content of each review. In different embodiments, the tf value of a particular word may be a raw number of instances of that word, a number of instances of that word adjusted for a length of the review content, a logarithmically scaled number of instances of that word (which may further decrease weight of words frequently occurring within the review content of a particular review), etc. The idf value for a particular word may be based a number of reviews within the review corpus including the word, and generally indicates at how common (or uncommon) of a particular word is within the review corpus. The idf value of uncommon words is typically higher than the idf value of common words. Generally, the higher the tf-idf value associated with a particular word, the more important or relevant the word is. The relevancy value assigned to a particular review may be based on a raw tf-idf value of all words in the review content of that particular review. Alternatively or additionally, words in the review corpus may be ranked according to their tf-idf value and used to generate a word hit list. The relevancy value assigned to a particular review may be based on at least one of (a) a number of words from the word hit list in the review content of that particular review or (b) a number of instances of particular words from the word hit list in the review content of that particular review.

Some embodiments may include more than one review corpus. For example, as described above, an extent of the plurality of reviews retrieved at block 602 may comprise reviews associated with a single product or service, reviews associated with a particular category of product or service, reviews associated with a plurality of related products or services, or all possible reviews. Some extents of the plurality of reviews may include more than one review corpus. For example, in embodiments where the plurality of reviews includes reviews associated with a particular category of product, the plurality of reviews may be divided into a product review corpus comprising reviews associated with a particular product and a category review corpus comprising reviews associated with the entire category of product. In such embodiments, block 603 may cause the summary processor 570 to generate a relevancy value for each review of the plurality of reviews based on both (a) the tf-idf values of the review content generated based on the product review corpus and (b) the tf-idf value of the review content based on the category review corpus. The two tf-idf values may be added or averaged to generate the relevancy value. Additionally or alternatively, words may be ranked based on the tf-idf value generated using the product review corpus to generate a product word hit list and also ranked based on the tf-idf value generated using a category word hit list. A relevancy value for a particular review may be based on a number of words, or a number of instances of a word, from the product word hit list, the category word hit list, or the combined product and category word hit lists present in the review content of that particular review. Similarly, in embodiments where the plurality of reviews includes reviews associated with a plurality of related products or services, the plurality of reviews may be divided into a first product review corpus comprising reviews associated with a first product and a second product corpus associated with a second product. Further, in embodiments where the plurality of reviews includes all possible reviews, the plurality of reviews may be divided into a product review corpus associated with a particular product, and a total review corpus associated with all possible reviews.

As an additional example of an embodiment where the relevancy value of a particular review is based on an informational density of the review content associated with that particular review, block 603 may involve causing the summary processor 570 to assign the relevancy value to a particular review based on a number of words and/or a number of instances of words from a defined word hit list. The defined word hit list may be generated by provider of a particular product or service or a potential future user of the product or service, and may include keywords associated with attributes (e.g., as described below, values data, features data and/or issues data) of the product or server that the provider or potential future user would like additional information on and may also be used to exclude attributes that the provider or potential future user does not care about.

In embodiments where the relevancy value of reviews is based on the review metadata associated with that review, block 603 may cause the summary processor 570 to assign and/or adjust the relevancy value associated with a particular review based on review metadata associated with that review. For example, the relevancy value of the review may be adjusted lower when the review metadata of that review indicates that the age of a user account associated with the review is relatively new, the user account has been using the product or service for a short period of time, the flag status of the user account indicates that it is a disabled or an untrust account, the time or date of the review indicates that the review is older and/or is associated with an older version of the product or service, and/or the flag status of the review indicates that the review might be a machine-generated review or a fake review. In contrast, the relevancy value of the review may be adjusted higher where the review metadata indicates that the age of the user account is older, the user account has been using the product or service for a long period of time, the flag status of the user account indicates that it is a trusted account, the time or date of the review indicates that the review is newer or is associated with a current version of the product or service, and/or the flag status of the review indicates that the review is a normal review.

The generate summary review process 600 may then continue to block 604, which may include codes causing the summary processor 570 to aggregate the plurality of reviews into the input prompt to be inputted into the LLM. As described in greater detail with the determine defined number of reviews process 650, in some embodiments, the reviews which are aggregated into the input prompt at block 604 may comprise a subset of reviews fewer than the plurality of reviews retrieved at block 602. In such embodiments, the subset of reviews may be selected based on relevancy values associated with different reviews of the plurality of reviews retrieved at block 602. In other embodiments, the subset of reviews to be aggregated into the input prompt may be selected randomly without considering the relevancy values assigned to the reviews. A number of reviews within the subset of reviews aggregated into the input prompt at block 604 may be based on a defined number of reviews. In some embodiments, the defined number of reviews may be hard-coded based the input prompt limit of the LLM, and may be retrieved from the defined number datastore 651. In other embodiments, the defined number of reviews may have been previously determined for a particular product or service, a particular category of product or service, for a plurality of products or services which are related or linked, for a plurality of products or services which are provided by the same provider, etc., and may be retrieved from the defined number datastore 651. In some embodiments, the defined number of reviews may be determined for one product or service falling within a particular category, and then expanded to be applied for other products or services within that particular category or all products or services within that particular category. In some embodiments, an average number of reviews may be determined for a set of products or services falling within a particular category, then expanded to be applied for other products or services within that particular category or all products or services within that particular category. In yet other embodiments, the defined number of reviews may also be specifically determined for a particular plurality of reviews retrieved at block 602.

The generate summary review process 600 then continues to block 606, which may include codes causing the summary processor 570 to input the input prompt comprising the subset of reviews aggregated at block 604 (or all reviews of the plurality of reviews retrieved at block 602 in some embodiments) into the LLM and yielding a summary review of the subset of reviews (or plurality of reviews) generated by the LLM. In some embodiments, block 606 may cause the summary processor 570 to engineer the input prompt to be submitted to the LLM. For example, in the embodiment shown, block 606 includes a series of subblocks 610, 612 and 614 which may include codes causing the summary processor 570 to engineer the input prompt to better standardize the summary review generated by the LLM from the subset of reviews (or the plurality of reviews) and which can result in standardized output that can be more easily processed by subsequent processors. In some embodiments, block 606 may not include any of the subblocks 610, 612 and 614, may include only some of the subblocks 610, 612 and 614, and/or may include additional or alternative subblocks.

In the embodiment shown, the subblock 610 include codes causing the summary processor 570 to input, as the input prompt, the subset of reviews (or the plurality of reviews) aggregated at block 604 into the LLM as input data, with instructions to generate attribute data of the subset of reviews (or the plurality of reviews). The input data of the input prompt generated at subblock 610 may include the review content and at least some of the review metadata for each review of the plurality of reviews. The instructions of the input prompt generated at subblock 610 may include instructions to extract standardized attributes from the reviews, which may better standardize the summary reviews eventually generated by the LLM. For example, the instructions may include instructions to generate at least one of values data (e.g., indicating what the reviews identified as valuable about the product or service), features data (e.g., indicating features of the product or service identified by the reviews), or issues data (e.g., indicating issues with the product or service identified by the reviews). In other embodiments, the attribute data may include additional or alternative types of data, including recommendation data (e.g., indicating whether the reviews indicated that the user associated with a review would recommend the product or service to others), image data (e.g., indicating whether the reviews are associated with an image), multimedia data (e.g., indicating the reviews are associated with multimedia content), etc. The attribute data may be a string of sentences or a list. The instructions may include defined commands or questions to extract the attribute data, including for example: "provide valuable aspects of the product or service identified in the reviews" (e.g., to generate the values data), "provide features of the product or service identified by the reviews" (e.g., to generate the features data), and/or "provide issues of the product or service identified by the reviews" (e.g., to generate the issues data). The defined commands or questions may be consistent across different subsets of reviews (or different pluralities of reviews), which may allow the generate summary review process 600 to extract standardized attributes from the different subsets of reviews (or different pluralities of reviews) and to generate more standardized reviews with the LLM.

As a more specific example, the input prompt may be a human-readable input prompt and/or a machine-readable input prompt. For example, in embodiments where the subset of reviews (or the plurality of reviews) aggregated at block 604 includes "review 1", "review 2", "review 3" [ . . . ] "review n" associated with product A, subblock 610 may cause the summary processor 570 to generate a human-readable input prompt comprising: "Here are reviews associated with product A: "review 1", "review 2", "review 3" [ . . . ] "review n". Provide a list of: (a) valuable components of product A identified in the reviews; (b) features of product A identified in the reviews; and (c) issues associated with product A identified in the reviews." An additional example of a human-readable input prompt may comprise: "Here are reviews associated with product A: "review 1", "review 2", "review 3" [ . . . ] "review n". Based on these reviews: (a) what value do users get out of product A; (b) what features of product A do users enjoy, and (c) are there any technical issues with the product A). Additionally or alternatively, subblock 610 may cause the summary processor 570 to generate a machine-readable input prompt comprising: "prompt": {"<product A review 1, review content, review metadata>, <product A review 2, review content, review metadata>, <product A review 3, review content, review metadata> [ . . . ] <product A review n, review content, review metadata>", "completion" ="provide list of values, features and issues associated with product A based on the reviews"}

Block 606 may then continue to subblock 612 which may include codes causing the summary processor 570 to input, as the input prompt, the attribute data generated at subblock 610 into the LLM as input data, with instructions to generate an initial summary of the subset of reviews (or the plurality of reviews) based on the attribute data. The input prompt generated at subblock 612 may also include additional input prompt context in addition to the input data (the attribute data generated at subblock 610) and the instructions (generate an initial summary). The additional input prompt context may include a text indication identifying features of the desired summary review, including a number of words, a number of sentences, a structure of summary review, a repetitiveness of attributes identified in the summary review, etc. In some embodiments, the additional input prompt context may also include the subset of reviews (or the plurality of reviews) aggregated at block 604. As a non-limiting example, subblock 612 may cause the summary processor 570 to generate a human-readable input prompt comprising: "Here are attribute data associated with product A: "value data 1", "value data 2", "value data 3" [ . . . ] "value data n"; "feature data 1", "feature data 2", "feature data 3" [ . . . ] "feature data n"; "issue data 1", "issue data 2", "issue data 3" [ . . . ] "issue data n". Based on this attribute data, generate a summary review having less than 10 sentences and having no repeated attributes". As a further non-limiting example, subblock 612 may cause the summary processor 570 to generate a machine-readable input prompt comprising: "prompt": {"<product A value data 1, product A value data 2, product A value data 3, [ . . . ] product A value data n>, <product A feature data 1, product A feature data 2, product A feature data 3, [ . . . ] product A feature data n>, <product A issue data 1, product A issue data 2, product A issue data 3, [ . . . ] product A issue data n>; "completion" = "generate a summary review having less than 10 sentences and having no repeated attributes"}

Block 606 may then continue to subblock 614 which may include codes causing the summary processor 570 to input, as the input prompt, the initial summary generated at subblock 612, with instructions to refine the initial summary into a final summary. The final summary generated at subblock 614 may be utilized as the summary review generated by the LLM. The input prompt generated at subblock 614 may also include additional input prompt context, such as a text indication including one or more examples of a desired final summary. In some embodiments, the additional input prompt context may also include the subset of reviews (or the plurality of reviews) aggregated at block 604. As a non-limiting example, subblock 614 may cause the summary processor 570 to generate a human-readable input prompt comprising: "Here is an initial summary generated for product A: "initial summary". Refine this initial summary into a final summary similar to the example final summaries provided below: "Users generally found values A and B valuable after using product A. Users generally identified features A and B as enjoyable features after using product A. Users had problems with issues A and B after using product A". As a further non-limiting example, subblock 614 may cause the summary processor 570 to generate a machine-readable input prompt comprising: "prompt": {"<initial summary>, "completion"="refine initial summary into a final summary"; "example"="Users generally found values A and B valuable after using product A. Users generally identified features A and B as enjoyable features after using product A. Users had problems with issues A and B after using product A"}

As noted above, in other embodiments, block 606 may not include any of the subblocks 610, 612 and 614, may include only some of the subblocks 610, 612 and 614, and/or may include additional or alternative subblocks. For example, some embodiments may not include subblock 614 and the initial summary generated at subblock 612 may instead be utilized as the summary review generated by the LLM.

The generate summary review process 600 may then continue to block 608, which may include codes causing the summary processor 570 to transmit and/or store the summary review generated by the LLM (e.g., the final summary generated at subblock 614). For example, the summary review may be stored in the summary review datastore 601. In some embodiments, the summary review may be stored in association with at least one of: the product or service for which the plurality of reviews retrieved at block 602 is regarding, a category of product or service for which the plurality of reviews retrieved at block 602 is regarding, the plurality of reviews retrieved at block 602, or the subset of reviews aggregated at block 604.

Additionally or alternatively, the summary review may also be transmitted to one or more of the content server 502 and/or the plurality of user devices 504A-504C. In some embodiments, the content server 502 may display the summary review associated with a particular product or service in the content associated with the product or service hosted by the content server 502. For example, referring briefly back to FIG. 4, the content server 502 may display a summary review of the software application 554 generated by the LLM on the webpage 552. The generate summary review process 600 then ends.

Determine Defined Number of Reviews Process 650

Figure 7:
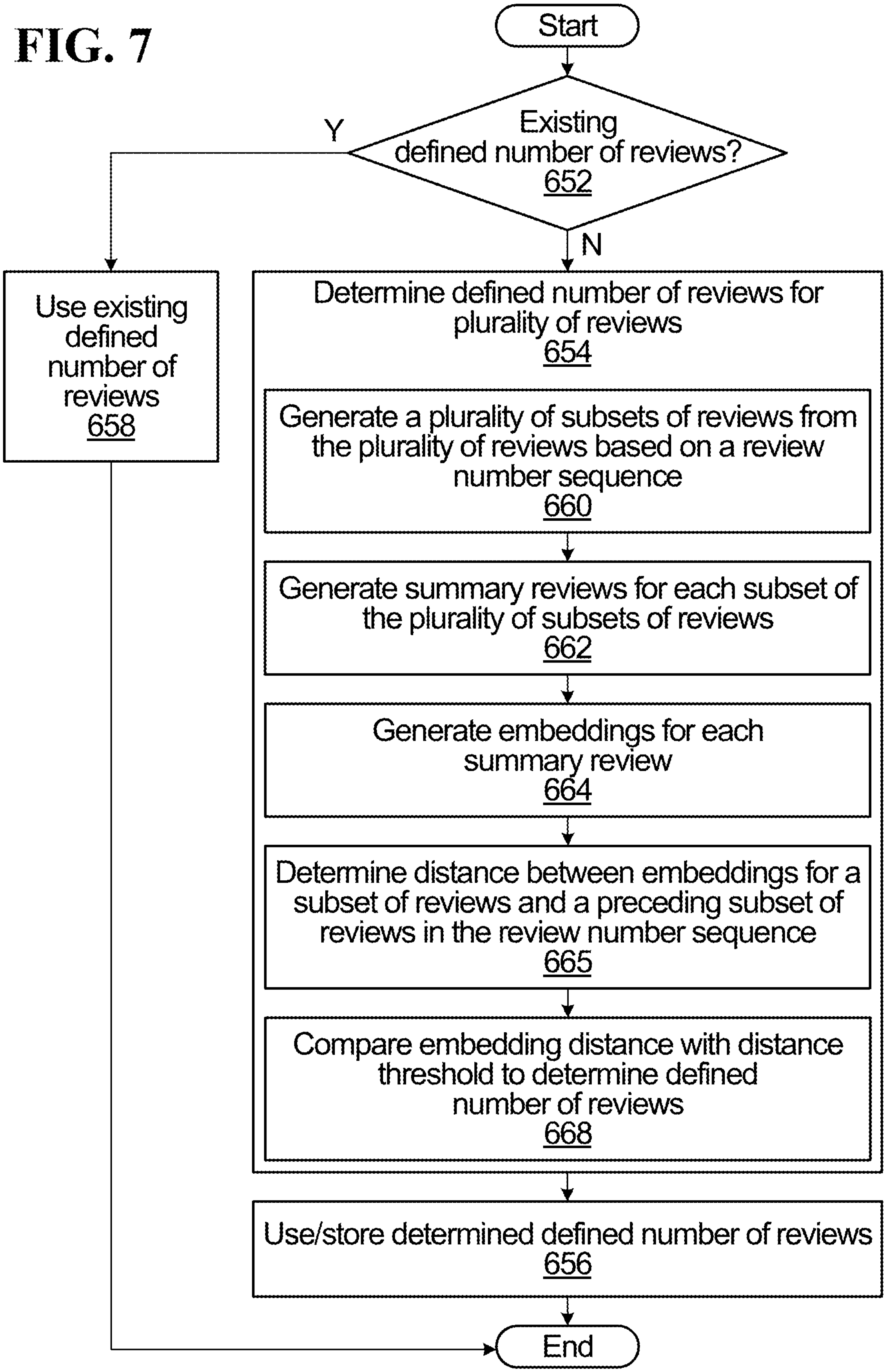
FIG. 7 is a flowchart of determine defined number of reviews process performed at the summary server of FIG. 5 in accordance with one embodiment.

Referring now to FIGS. 5-7, a computer-implemented process for determining a defined number of reviews (forming a subset of reviews) from a plurality of reviews (e.g., at block 602 of the generate summary review process 600) which should be aggregated into an input prompt into a LLM (e.g., at block 604 of the generate summary review process 600) is generally shown at 650. Aggregating only a subset of reviews of the plurality of reviews into the input prompt may be technically required in some embodiments as a particular LLM typically has an input prompt limit on a number tokens which may form any single input prompt into that LLM. This input prompt limit may be an inherent technical limitation associated with an underlying size of a position embedding matrix, or an output size of certain transformation layers of, the LLM. Accordingly, it may not be possible to insert every review for a particular product or service (or every review for a particular category of product or service, every review for a plurality of related products or services, or all possible reviews, depending on the extent of the plurality of reviews retrieved at block 602 discussed above) into an input prompt. A further technical advantage of using only a subset of reviews as the input prompt is decreasing an amount of processing time and computing resources required by the LLM to yield a summary review based on the subset of reviews. Additionally, the generate summary review process 600 may select the reviews to be used as the input prompt based on a relevancy value assigned to each review, and may select reviews having a high relevancy value while discarding reviews having a low relevancy value. A technical advantage of aggregating reviews having a high relevancy value is that a quality of a summary review generated by the LLM based on such reviews may be higher than a quality of a summary review generated based on all reviews. For example, reviews having a low relevancy value may be irrelevant, uninformative, or represent an insignificant variation from other reviews, and their inclusion in the input prompt may result in a lower quality summary review generated by the LLM.

In the embodiment shown, the determine defined number of reviews process 650 is performed by the summary processor 570 executing processor, machine and/or computer readable instructions stored in the program memory 574; in other embodiments, the determine defined number of reviews process 650 may comprise processor, machine and/or computer readable instructions alternatively stored on other non-transitory computer readable storage medium; in yet other embodiments, the determine defined number of reviews process 650 and/or parts thereof could alternatively be executed by a device other than the summary processor 570. Further, although the determine defined number of reviews process 650 in accordance with one embodiment is described with reference to the flowchart illustrated in FIG. 6, other methods of implementing the determine defined number of reviews process 650 may alternatively be used. For example, the order of execution of the blocks may be altered, and/or some of the blocks described may be altered, eliminated, or combined.

In the embodiment shown in FIG. 7, the determine defined number of reviews process 650 may begin at block 652, which may include codes causing the summary processor 570 to determine whether it is necessary to determine a defined number of reviews for a plurality of reviews retrieved at block 602. As described above, in some embodiments, the defined number of reviews may be hard-coded based the input prompt limit of the LLM and/or may have been a previously determined (e.g., and stored in the defined number datastore 651) a particular product or service, for a particular category, for a particular set of related products or services, etc., depending on the extent of the plurality of reviews retrieved at block 602. Block 652 may cause the summary processor 570 to search the defined number datastore 651 to determine whether there is a defined number of reviews stored in association with a particular LLM or stored in association with a particular product or service that corresponds to the product or service associated with the plurality of reviews. In some embodiments, block 652 may also cause the summary processor 570 to search the defined number datastore 651 to determine whether there is a related defined number of reviews stored for a related category of product or service corresponding to the plurality of reviews, related products or services corresponding to the reviews or a same provider of corresponding to the plurality of reviews, and the related defined number of reviews may then be expanded to be applied for the plurality of reviews as well.

If at block 652, the summary processor 570 determines that there is no defined number of reviews which can be retrieved for the plurality of reviews, the determine defined number of reviews process 650 continues to block 654, which may include codes causing the summary processor 570 to determine the defined number of reviews applicable for the plurality of reviews. In the embodiment shown, block 654 involves a series of subblocks 660, 662, 664, 665, and 668 for determining the defined number of reviews. However, in other embodiments, block 654 may not include any of the subblocks 660, 662, 664, 665 and 668, may include only some of the subblocks 660, 662, 664, 665 and 668, and/or may include additional or alternative subblocks.

Block 654 may begin at subblock 660, which may include codes causing the summary processor 570 to generate a plurality of subsets of reviews using the plurality of reviews retrieved at block 602 of the generate summary review process 600. Each subset may include a different number of reviews, and the number of reviews within each subset may be varied according to a review number sequence. In some examples, the review number sequence may be an increasing number sequence such as an arithmetic sequence (e.g., a, a+d, a+2d, a+3d [ . . . ] a+nd). In such embodiments, a may comprise a first number of reviews in the review number sequence, a+d may comprise a second number of reviews in the review number sequence, a+2d may comprise a third number of reviews in the review number sequence, etc. Variables a and d may be constant and may range anywhere between 1-100. As a more specific example, when variables a and d are both 10, the review number sequence may be (10 reviews, 20 reviews, 30 reviews [ . . . ] 10+n*10 reviews). As another more specific example, when variable a is 5 and variable d is 10, the review number sequence may be (5 reviews, 15 reviews, 25 reviews [ . . . ] 5+n*10 reviews). In other embodiments, the review number sequence may be another type of increasing number sequence, including a multiplication sequence (e.g., a, a*d, a*2d, a*3d [ . . . ] a*nd), a geometric sequence, a triangular number sequence, a squared number sequence, etc.

The actual reviews which are included in each subset of reviews may be determined based on the relevancy value of the reviews determined at block 603 of the generate summary review process 600 and may specifically comprise reviews which have a highest relevancy value. For example, a first subset of reviews generated at subblock 660 may include a number of reviews corresponding to the first number (e.g., a in the arithmetic sequence described above) in the review number sequence. This first subset of reviews may comprise the first number of reviews selected from the plurality of reviews (e.g., retrieved at block 602 of the generate summary review process 600) having the highest relevancy values. Similarly, the second subset of reviews may include a number of reviews corresponding to the second number (e.g., a+d in the arithmetic sequence described above) in the review number sequence. This second subset of reviews may comprise the second number of reviews selected from the plurality of reviews having the highest relevancy values. As a more specific example, in embodiments where the review number sequence comprises an arithmetic sequence and variables a and d are both 10, the first subset of reviews may comprise the top 10 reviews of the plurality of reviews in terms of relevancy value, the second subset of reviews may comprise the top 20 reviews in terms of relevancy value, a third subset of reviews may comprise the top 30 reviews in terms of relevancy value, etc.

Further, in embodiments where the number of reviews included in each subset of reviews are (a) based on the review number sequence comprising an increasing sequence and (b) based on selecting reviews having the highest relevancy value, the reviews which are included in a particular subset of reviews in the review number sequence will include all reviews which were included in preceding subsets of reviews in the review number sequence as well as additional reviews. The second subset of reviews may include all reviews included in the first subset of reviews; similarly, the third subset of reviews may include all reviews included in both the first and second subsets of reviews. As a more specific example, in the embodiment described above where the review number sequence comprises an arithmetic sequence and the variables a and d are both 10, the second subset of reviews comprising the top 20 reviews in terms of relevancy value will include the top 10 reviews in terms of relevancy value forming the first subset of reviews; similarly, the third subset of reviews comprising the top 30 reviews in terms of relevancy value will include both the top 20 reviews forming the second subset of reviews and the top 10 reviews forming the first subset of reviews, and etc.

After the plurality of subsets of reviews are generated at subblock 660, block 654 may then proceed to subblock 662, which may include codes causing the summary processor 570 to generate summary reviews for each subset of reviews of the plurality of different subset of reviews generated at subblock 660 using the LLM. In some embodiments, subblock 662 may include codes of subblocks 610, 612 and 614 of block 606 of the generate summary review process 600 and may include codes causing the summary processor 570 to generate attribute data for each subset of reviews (in a manner similar to subblock 610 described above), generate an initial summary for each subset of reviews based on the attribute data (in a manner similar to subblock 612 described above) and then generate a final summary for each subset of reviews based on the initial summary and one or more examples summary reviews (in a manner similar to subblock 614 described above), where the final summary comprises the summary review for the each subset of reviews. In other embodiments, subblock 662 may be modified in a manner similar to block 606, and may include modifications or omissions of some of the subblocks 610, 612 and 614.

After a corresponding summary review for each subset of reviews of the plurality of different subset of reviews is generated by the LLM at subblock 662, block 654 may then proceed to subblock 664, which may include codes causing the summary processor 570 to generate embeddings for each summary review generated at subblock 662. The embedding may be a semantic embedding generated using a natural language processing model, such as text-embedding-ada-002, BERT, spaCy or SBERT for example. A "semantic embedding" may be a semantic vector representation of a meaning of different tokens forming content of the summary review. For example, the semantic embedding of a token may be [0.34567789, −0.67963753921, 1.45239783693, 0.002587369, . . . ]. A technical advantage of utilizing embeddings of the summary reviews in order to analyze differences between summary reviews generated using different subsets of reviews is an increase in standardization the analysis of such differences.

After the embeddings are generated for each summary review at subblock 664, block 654 may then proceed to subblock 665, which may include codes causing the summary processor 570 to determine a distance between the embedding generated for a summary review of a particular subset of reviews and the embedding generated for a preceding summary review of a preceding subset of reviews in the review number sequence. In some embodiments, the preceding subset of reviews comprises an immediately preceding subset of reviews in the review number sequence. For example, the embedding generated for the summary review of the second subset of reviews in the review number sequence may be compared to the embedding generated for the summary review of the first subset of reviews in the review number sequence, while the embedding generated for the summary review of the third subset of reviews in the review number sequence may be compared to the embedding generated for the summary of the second subset of reviews. As a more specific example, in the embodiment described above where the review number sequence comprises an arithmetic sequence and the variables a and d are both 10, an embedding generated for a summary review of the second subset of reviews comprising the top 20 reviews may be compared to an embedding generated for a summary review of the first subset of reviews comprising the top 10 reviews; similarly, an embedding generated for the third subset of reviews comprising the top 30 reviews may be compared to the embedding generated for the summary review of the second subset of reviews comprising the top 20 reviews. In other embodiments, the preceding subset of reviews may comprise any preceding subset of reviews in the review number sequence and may not necessarily comprise the immediately preceding subset of reviews. For example, the embedding generated for the summary review of the third subset of reviews may be compared to the embedding generated for the summary review of the first subset of reviews in some embodiments.

The distance measure of the distance between the embeddings may comprise any distance measures of distance between vectors, such as at least one of an Euclidean distance, a cosine distance, a Minkowski distance, or a Manhattan distance for example. The distance measures may include more than one distance measure in some embodiments.

Figure 8A:
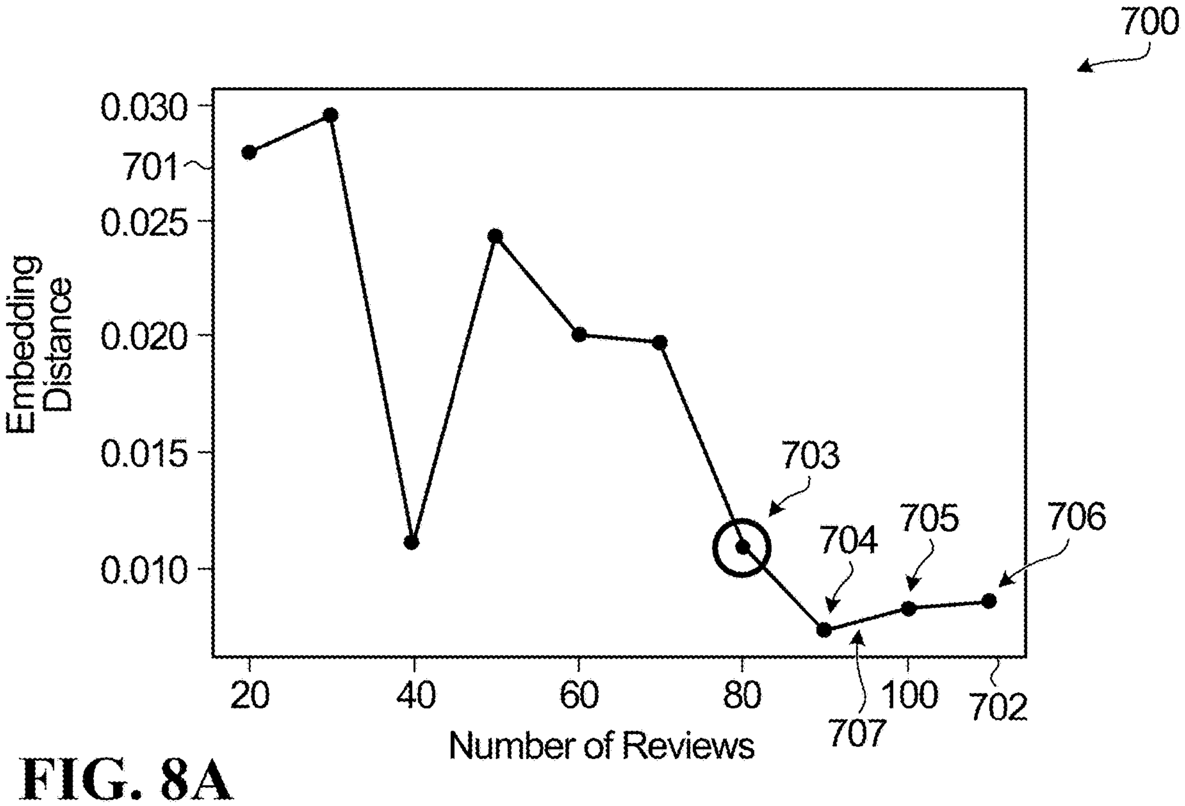
FIGS. 8A, 8B, 8C and 8D depict embedding distances determined by the determine defined number of reviews process of FIG. 7 for different subsets of reviews in accordance with one embodiment.
Figure 8B:
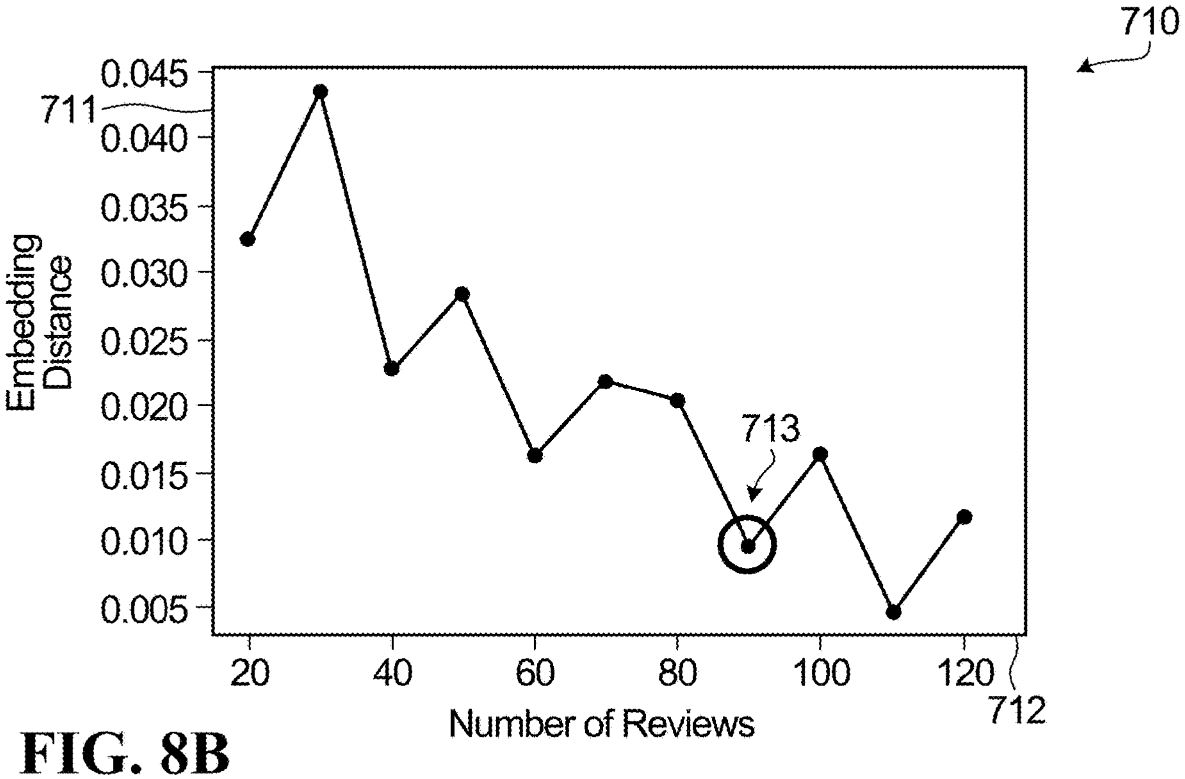
Figure 8C:
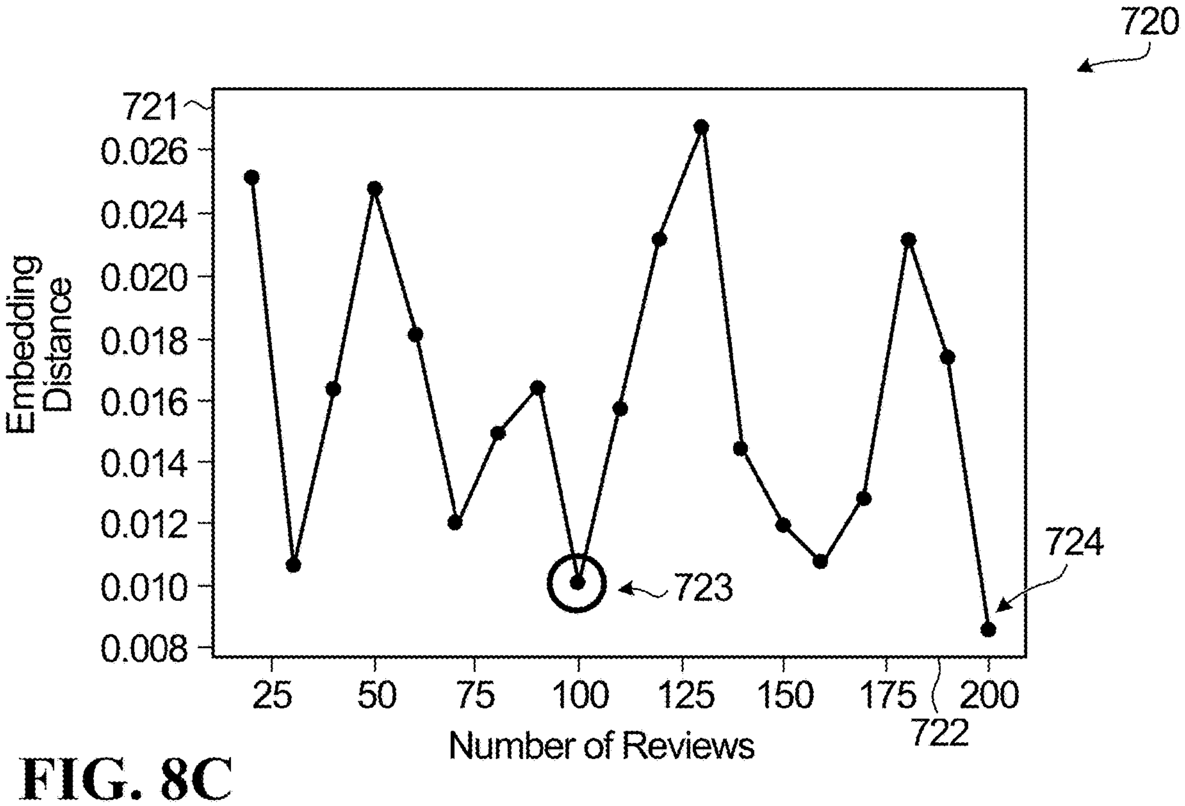
Figure 8D:
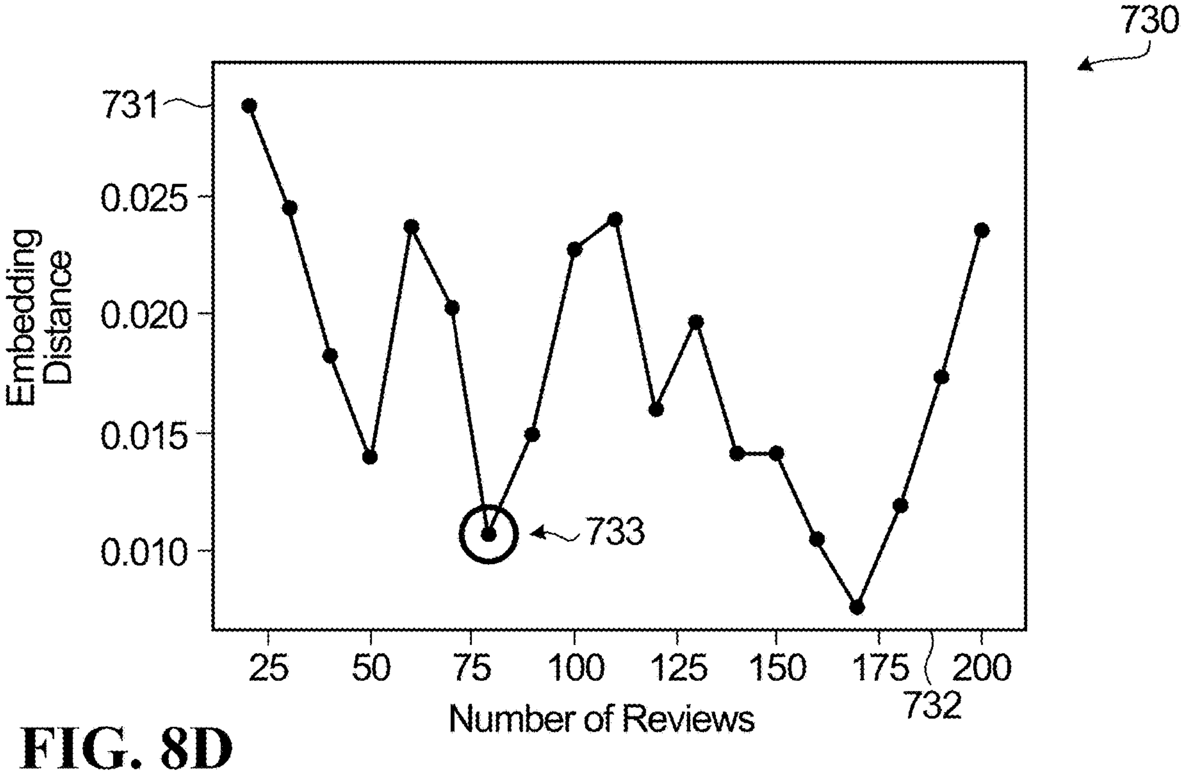

In some embodiments, the distance between embeddings of summary reviews decreases as the number of reviews used to generate the summary reviews increases, due to the initial sorting via the relevancy value assigned to the plurality of reviews described above. For example, the reviews which are included in any particular subset of reviews may be the reviews having the highest relevance values. As a result, when more reviews are added to that particular subset, the relevancy value of each additional review is lower than the relevancy value of each preceding review. Subsets of reviews including a larger number of reviews may thus include a larger number of reviews having a lower relevancy value, which can in turn reduce the quality of the summary review which is eventually generated by the LLM. Additionally, as described above, it may not be possible to include a large number of reviews due to the input prompt limit associated existing LLMs. The distance between embeddings (also referred to as "embedding distance") of summary reviews may be used to determine when the gain in information in a summary review generated by the LLM due to additional reviews may be nominal. In this regard, block 652 may then proceed to subblock 668, which may include codes causing the summary processor 570 to compare the embedding distances generated to a distance threshold to determine the defined number of reviews. The distance threshold may indicate a threshold at which a difference between embeddings of summary reviews resulting from additional reviews (i.e., the information gained from additional reviews) is nominal. The distance threshold may be a percentage of a maximum distance and may be between approximately 0.5% and approximately 50% of the maximum distance for example. The maximum distance may be a largest distance determined for a particular plurality of subsets of reviews (eg. 0.03 in plot 700 shown in FIG. 8A, 0.044 in plot 710 shown in FIG. 8B, 0.025 in plot 720 shown in FIG. 8C and 0.03 in plot 730 shown in FIG. 8D), or may be the highest possible distance (e.g., 1 for cosine distance). The distance threshold may also be determined by humans manually reading summaries of reviews to determine when differences between summaries of reviews are no longer significant.

In some embodiments, the defined number of reviews may be the number of reviews in a first instance of a subset of reviews where the embedding distance between an embedding for that subset and an embedding for a preceding subset falls below the distance threshold. For example, referring to FIGS. 8A-8D, the plots 700, 710. 720 and 730 illustrate embedding distances between summary reviews generated based on different numbers of reviews in a review number sequence for respectively, a particular product A, a particular product B, a particular product C and a particular product D. The products A and B may be more specialized products having specific features, whereas products C and D may comprise more general products having more general features. The embedding distance being measured in all plots 700, 710, 720 and 730 comprises a cosine distance shown on respective y-axes 701, 711, 721 and 731. Additionally, the review number sequence in all the plots 700, 710, 720 and 730 comprises an arithmetic sequence where variables a and b are both 10, with the number of reviews shown on the respective x-axes 702, 712, 722 and 732. As shown in plots 700 and 710, for more specialized products, the embedding distance between summary reviews generated based on adjacent subsets of reviews in the review number sequence decreases as the number of reviews used to generate the summary reviews increases, which indicates that the information gained from each additional review decreases. However, as shown in plots 720 and 730, in for more general products, the embedding distance between summary reviews may increase after a local minimum. However, due to the initial sorting of reviews via the relevancy value, having a larger number of reviews may not be desirable as the relevancy of additional reviews is a lower than the relevancy value of preceding reviews. Utilizing lower numbers of reviews leverages the relevancy value to include only the most relevant reviews in the subset of reviews. As described above, utilizing the most relevant reviews may increase the quality of the summary review generated by the LLM while staying within the input prompt limit of the LLM and decreasing the processing time and processing resources required to generate the summary review.

In the embodiments shown in FIGS. 8A-8D the distance threshold selected is approximately 0.01 (or approximately 1% of the maximum cosine distance of 1). In plot 700 of FIG. 8A, the number of reviews within a first instance of a subset of reviews having a distance below the distance threshold is the subset of reviews 703 having 80 reviews, and 80 may thus be utilized by the summary processor 570 as the defined number of reviews to be included in the subset of reviews for product C which is aggregated into the input prompt at block 604 of the generate summary review process 600. In plot 710 of FIG. 8B, the number of reviews within a first instance of a subset of reviews having a distance below the distance threshold is the subset of reviews 713 have 90 reviews, and 90 may be utilized as the defined number of reviews for product B which is aggregated into the input prompt. In plots 720 and 730 of FIGS. 8C and 8D, the number of reviews within a first instance of a subset of reviews having a distance below the distance threshold is respectively the subset of reviews 723 having 100 reviews and the subset of reviews 733 80 reviews, and 100 may be utilized as the defined number of reviews for product C and 80 may be utilized as the defined number of reviews for product D. In some other embodiments, the defined number of reviews may be the number of reviews in another instance (such as a second or third instance for example) of a subset of reviews where the distance between an embedding for that subset and an embedding for a preceding subset falls below the distance threshold.

In some other embodiments, the defined number of reviews may be the number of reviews in an instance of a subset of reviews after which all subsequent embedding distances for all subsequent analyzed subsets of reviews stays below the distance threshold. For example, in the plot 700 of FIG. 8A, the embedding distance of the 80 subset of reviews 703 and all subsequent subsets of reviews (a 90 subset of reviews 704, a 100 subset of reviews 705 and the 110 subset of reviews 706) is below the distance threshold of 0.01, and 80 may be utilized as the defined number of reviews for the product A. Similarly, in the plot 720 of FIG. 8C, the embedding distance of a 200 subset of reviews 724 is below the distance threshold of 0.01 and is the last analysed subset of reviews, and 200 may be utilized as defined number of reviews for product C. In contrast, in plots 710 and 730 of FIGS. 8B and 8D, there are no subsets of reviews after which all subsequent embedding distances for all subsequent analysed subset of reviews stays below the distance threshold, and additional subsets of reviews may need to be analysed in order to determine the defined number of reviews for the products B and D.

In some other embodiments, the defined number of reviews may be the number of reviews in subsets of reviews with embedding distances forming a plateau where there is no significant variation in the embedding distance. The plateau may be formed at or around the distance threshold, such as between approximately +5% and approximately +20% of the distance threshold for example. The plateau may also be formed independent of the distance threshold, and may instead be relative to the embedding distances forming the plateau, and may be formed when the embedding distances are between approximately +5% to approximately +20% of adjacent embedding distances. The defined number of reviews may be the number of reviews in a first subset of the subsets of reviews forming the plateau, the number of reviews in a final subset of the subsets forming the plateau, or the averaged number of reviews in the subsets forming the plateau. For example, in the plot 700 of FIG. 8A, the 80, 90, 100 and 110 subsets of reviews 703, 704, 705 and 706 may form a plateau 707 where there is no significant variation in the embedding distance. 80 may be utilized in embodiments where the defined number of reviews corresponds to the first subset 703 of the plateau 707; 110 may be utilized in embodiments where the defined number of reviews corresponds to the final subset 706 of the plateau 707; and 95 (being (80+90+100+110)/4) may be utilized in embodiments where the defined number of reviews corresponds to the averaged number of reviews of subsets forming the plateau 707.

The determine defined number of reviews process 650 may then continue to block 656, which may include codes directing the summary processor 570 to store the defined number of reviews generated at block 654 for future use and/or use the defined number of reviews (e.g., at block 604 of the generate summary review process 600). For example, the summary review may be stored in the defined number datastore 651 in association with the product or service identifier for which the initial plurality of reviews corresponds to (e.g., in the examples described above, 80 may be stored in association with product A while 90 may be stored in association with product B). The determine defined number of reviews process 650 may then end.

If at block 652, the summary processor 570 determines that there is a defined number of reviews which can be retrieved for the plurality of reviews, the determine defined number of reviews process 650 continues to block 658, which may include codes causing the summary processor 570 to retrieve an existing defined number of reviews from the defined number datastore 651 and use the defined number of reviews (e.g., at block 604 of the generate summary review process 600). The defined number of reviews for a particular product or service, or for a particular category of product or service or for a plurality of related products or services may be recalculated periodically. The determine defined number of reviews process 650 may then end.

Alternative Method 750 for Generating a Summary Review using an LLM

Referring to FIG. 9, a computer-implemented method for using a generative language model, such as the LLMs described above, to generate a summary review message based on an input prompt is generally shown at 750. The input prompt may comprise an aggregation of a plurality of reviews (or a subset of reviews) retrieved from the content server 502 or extracted from external sources, including external content not hosted by the content server 502, external websites, external web applications, external multimedia content, etc., as described above. In the embodiment shown, the method 750 is performed by the summary processor 570 executing processor, machine and/or computer readable instructions stored in the program memory 574; in other embodiments, the method 750 may comprise processor, machine and/or computer readable instructions alternatively stored on other non-transitory computer readable storage medium; in yet other embodiments, the method 750 and/or parts thereof could alternatively be executed by a device other than the summary processor 570, including for example, by the external model server. Further, although the summary processor 570 in accordance with one embodiment is described with reference to the flowchart illustrated in FIG. 9, other methods of implementing the method 750 may alternatively be used. For example, the order of execution of the blocks may be altered, and/or some of the blocks described may be altered, eliminated, or combined.

At block 752, the summary processor 570 assigns relevancy values to reviews of the plurality of reviews. The relevancy values assigned to a review may be based on the review content associated with that review, such as an informational density of the review content or keywords within the review content. For example, a tf-idf value of the review content may be generated, and the relevancy value assigned to a review may be based on at least one of (a) a raw tf-idf value of all words in the review content, (b) a number of words in the review content matching words of a word hit list generated based on the tf-idf values of all words in a review corpus formed using the plurality of reviews or (c) a number of instances of words in the review content matching words of the word hit list. Additionally or alternatively, the relevancy value assigned to a review may be based on at least one of (b) a number of words in the review content matching words of a defined word hit list or (c) a number of instances of words in the review content matching words of the defined word hit list. The defined word hit list may be generated by a provider or future user and may include keywords associated with attributes that the provider or potential future user would like to more information on. The relevancy values assigned to a review may also be based on the review metadata associated with that review, wherein the review metadata may include an age of the user account leaving the review, a flag status of the user account, a recency of the review, a flag status of the review etc.

At block 754, the summary processor 570 aggregates a subset of reviews from the plurality of reviews into an input prompt, where the subset of reviews are selected based on the relevancy value assigned to reviews in the plurality of reviews. The subset of reviews may include reviews of the plurality of reviews having highest relevancy values. The subset of reviews may include a defined number of reviews of the plurality of reviews.

In some embodiments, block 754 may direct the summary processor 570 to determine the defined number of reviews. For example, block 754 may direct the summary processor 570 to generate a plurality of subsets of reviews, wherein each subset of reviews of the plurality of subsets of reviews includes a number of reviews selected according to a review number sequence. The review number sequence may be an increasing number sequence, such as an arithmetic sequence, a multiplication sequence, a triangular number sequence, a squared number sequence, a geometric sequence, etc. In embodiments where the number of reviews included in each subset of reviews are (a) based on the review number sequence and (b) based on selecting reviews having the highest relevancy value, the reviews which are included a particular subset of reviews in the review number sequence may include all reviews which were included in preceding subsets of reviews in the review number sequence as well as additional reviews.

Block 754 may also direct the summary processor 570 to generate a corresponding summary review using the generative language model for each subset of reviews of the plurality of subsets of reviews and to determine a distance between an embedding generated from a summary review of a particular subset of reviews and a corresponding embedding generated from a preceding summary review of a preceding subset of reviews in the review number sequence. The embedding may comprise a semantic embedding representing a semantic vector representation of a meaning of different tokens forming content of the summary review. The distance may comprise at least one of a Euclidean distance, a cosine distance, a Minkowski distance, or a Manhattan distance. The preceding subset of reviews may be an immediately preceding subset of reviews (relative to the particular subset of reviews) in the review number sequence.

Block 754 may also direct the summary processor 570 determine, as the defined number of reviews, a number of reviews in a particular subset of reviews of the plurality of subsets of reviews having the embedding distance below a distance threshold. The distance threshold may comprise between approximately 0.5% and approximately 50% of a maximum distance. The maximum distance may be a largest distance determined for a particular plurality of subsets of reviews, or may be the highest possible distance for some distance measurements. In some embodiments, the defined number of reviews may be the number of reviews in a first instance of a subset of reviews having an embedding distance falling below the distance threshold. In other embodiments, the defined number of reviews may be the number of reviews in an instance of a subset of reviews after which all subsequent embedding distances for all subsequent analyzed subsets of reviews stays below the distance threshold. In yet other embodiments, the defined number of reviews may be the number of reviews in subsets of reviews with embedding distances forming a plateau. The plateau may be formed at or around the distance threshold, such as approximately +5% to approximately +20% of the distance threshold. The defined number of reviews may be the number of reviews in a first subset of the subsets of reviews forming the plateau, the number of reviews in a final subset of the subsets forming the plateau, or an averaged number of reviews in the subsets forming the plateau.

At block 756, the summary processor 570 inputs the input prompt into a generative language model yielding a summary review of the subset of reviews generated by the generative language model. In some embodiments, block 756 may direct the summary processor 570 to input the input prompt comprising the subset of reviews into the generative language model yielding attribute data associated with the subset of reviews generated by the generative language model. The input prompt may comprise instructions to generate attribute data which may include at least one of values data, features data, or issues data. Block 756 may also direct the summary processor 570 to input the attribute data into the generative language model yielding an initial summary generated by the generative language model. The input prompt may comprise instructions to generate an initial summary of the subset of reviews (or the plurality of reviews) based on the attribute data and may further include a text indication identifying features of the desired initial summary, including a number of words, a number of sentences, a structure of summary review, a repetitiveness of attributes identified in the summary review, etc. Block 756 may also direct the summary processor 570 to input the initial summary and context including one or more example summary reviews into the generative language model yielding a final summary generated by the generative language model. The final summary may comprise the summary review.

Figure 10:
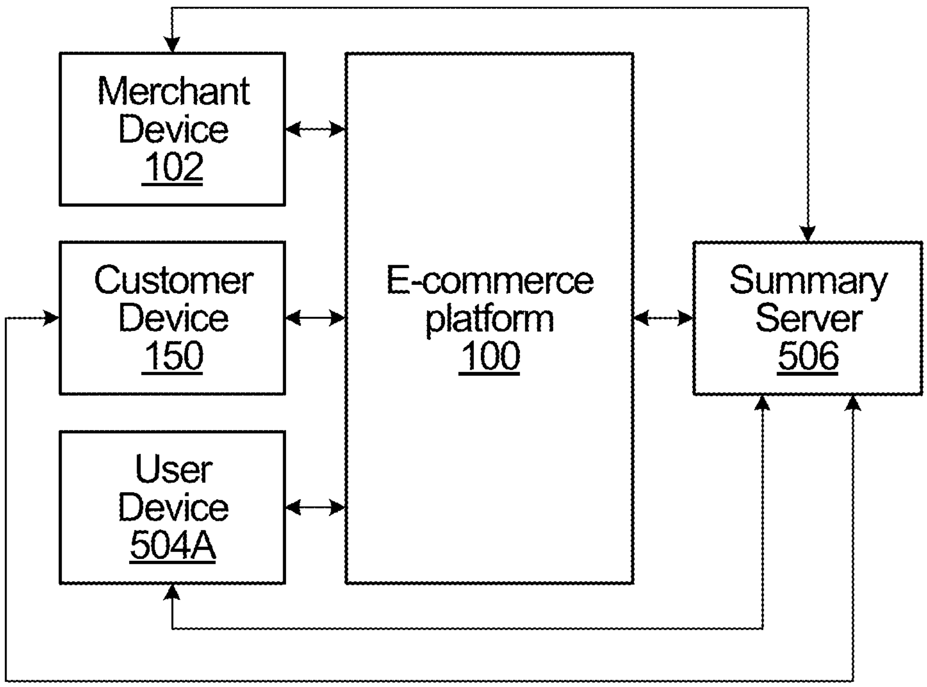
FIG. 10 is a block diagram of a software platform in accordance with another embodiment incorporating an example e-commerce platform.

FIG. 10 illustrates an example in which the content server 502 of FIG. 3 is a commerce platform, referred to as e-commerce platform 100. The plurality user devices 504A-504C may include customer device 150 and/or the merchant device 102. The e-commerce platform 100 may host content including a plurality of reviews. One example of an e-commerce platform 100 is described below for completeness, it being understood that the methods described herein need not be limited to e-commerce because many platforms outside of e-commerce have multiple computer systems that offer services to users and may generate event messages for users.

Example E-Commerce Platform

Although integration with a commerce platform is not required, in some embodiments, the methods disclosed herein may be performed on or in association with a commerce platform such as an e-commerce platform. Therefore, an example of a commerce platform will be described.

Figure 11:
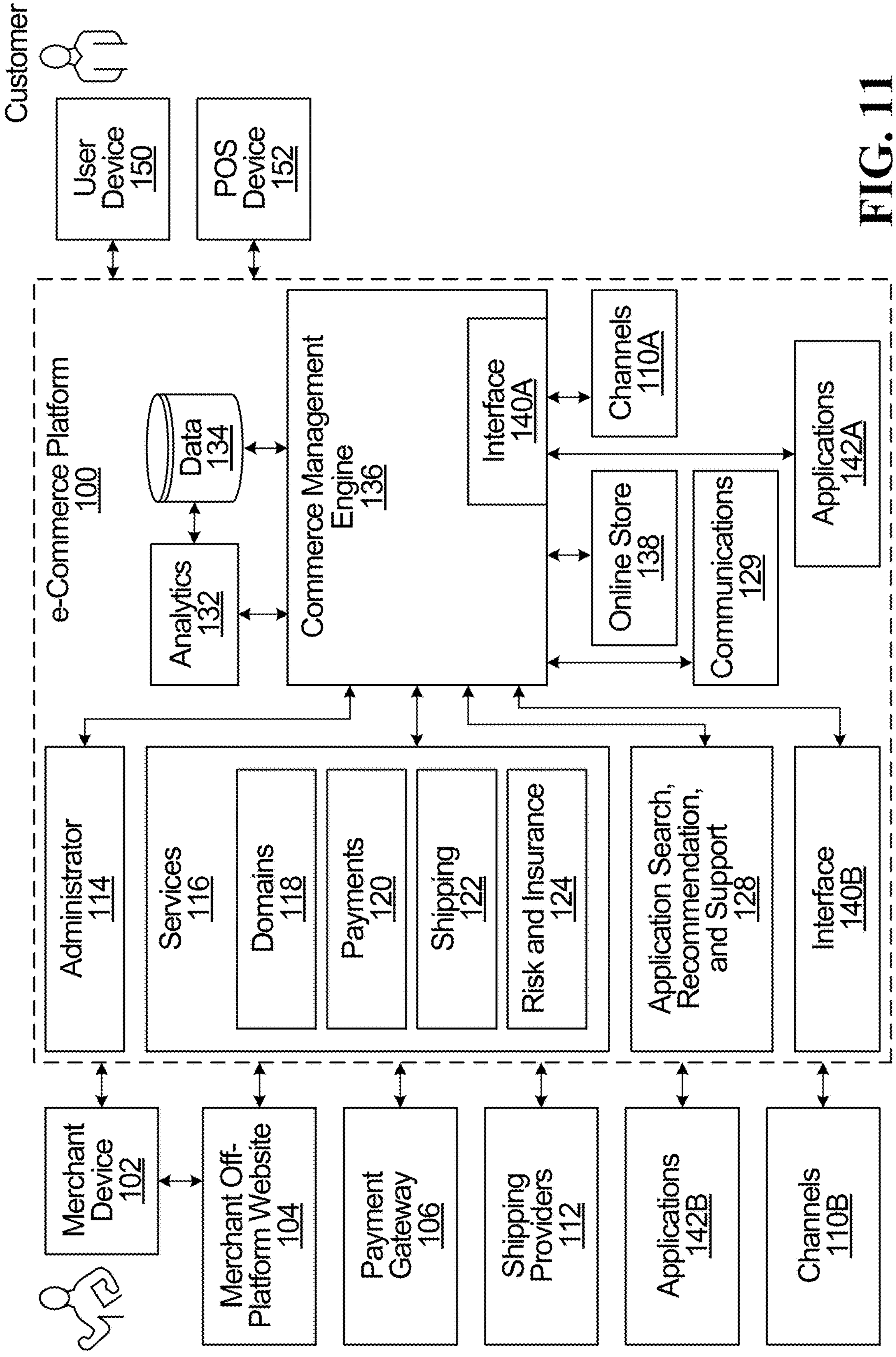
FIG. 11 is a block diagram of the e-commerce platform of FIG. 10 in accordance with one embodiment.

FIG. 11 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 11, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 12:
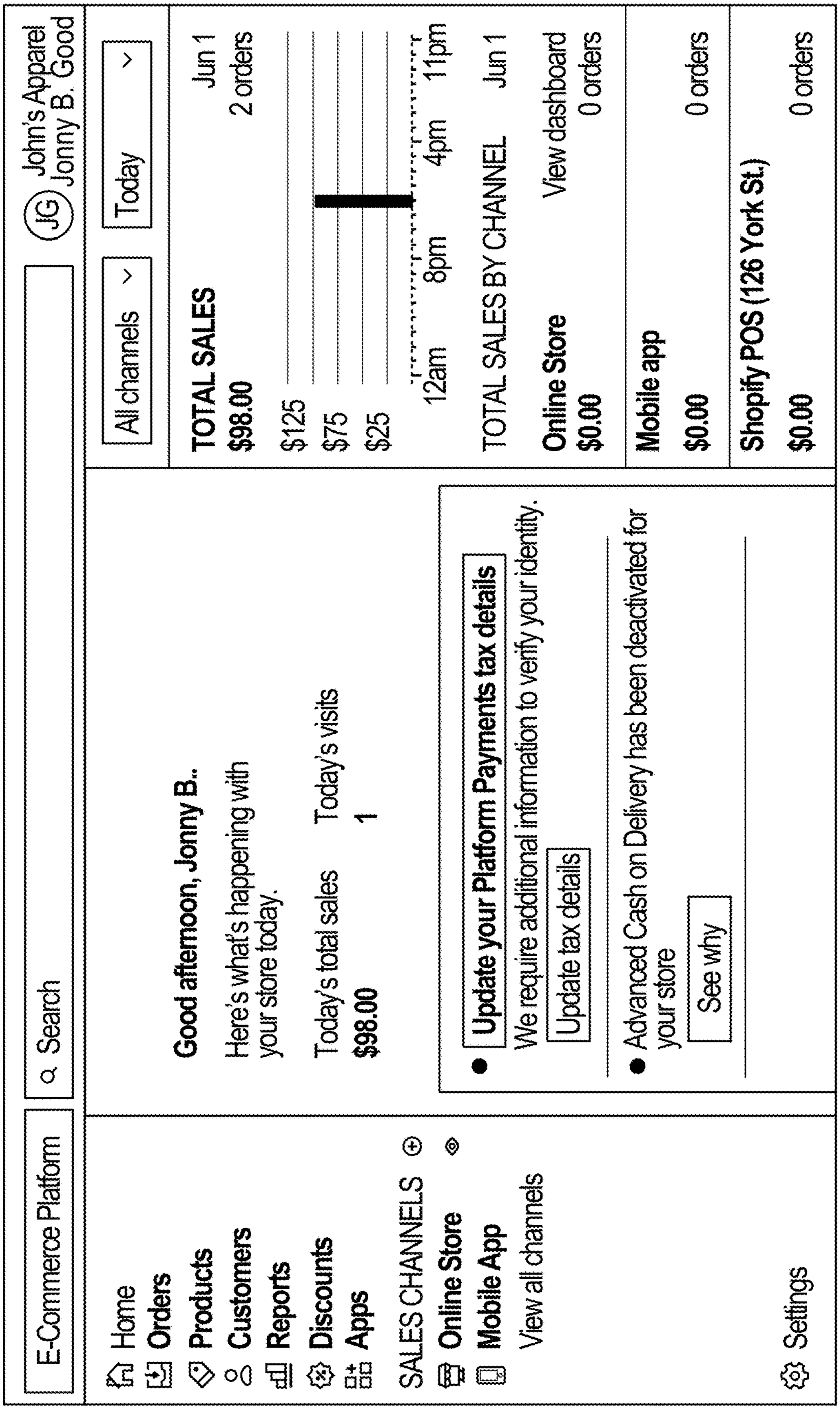
FIG. 12 illustrates a home page of an administrator of the e-commerce platform of FIG. 11, according to one embodiment.

FIG. 12 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 12. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 11, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral datastore.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date based ledger that records sale related events that happened to an item).

Conclusion

The term "substantially" and "approximately" means a proportion of at least about 60%, or at least about 70% or at least about 80%, or at least about 90%, at least about 95%, at least about 97% or at least about 99% or more, or any integer between 70% and 100%.

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

Although the present invention has been described with reference to specific features and embodiments thereof, various modifications and combinations may be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions, and alterations may be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor-readable storage medium or media for storage of information, such as computer/processor-readable instructions, data structures, program modules, and/or other data. A non-exhaustive list of examples of non-transitory computer/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor-readable storage media.

Memory, as used herein, may refer to memory that is persistent (e.g., read-only-memory (ROM) or a disk), or memory that is volatile (e.g., random access memory (RAM)). The memory may be distributed, e.g., a same memory may be distributed over one or more servers or locations.

The invention claimed is:

1. A computer-implemented method comprising:
- assigning relevancy values to reviews of a plurality of reviews;
- automatically aggregating a subset of reviews from the plurality of reviews into an input prompt, the subset of reviews selected based on the relevancy values assigned to reviews in the plurality of reviews and the subset of reviews comprising a defined number of reviews, wherein determining the defined number of reviews comprises:
  - generating a plurality of subsets of reviews, wherein each subset of reviews of the plurality of subsets of reviews includes a number of reviews;
  - for each subset of reviews of the plurality of subsets of reviews:
    - inputting that subset of reviews into a generative language model yielding a summary of that subset of reviews;
    - generating a semantic embedding of the summary of that subset of reviews; and
    - determining a distance between the semantic embedding of the summary of that subset of reviews and a corresponding semantic embedding of a preceding summary of a preceding subset of reviews of the plurality of subsets of reviews; and
  - determining, as the defined number of reviews, a number of reviews in a particular subset of reviews of the plurality of subsets of reviews having the distance below a distance threshold; and
- inputting the input prompt into the generative language model yielding a summary review of the subset of reviews generated by the generative language model.

2. The computer-implemented method of claim 1, wherein a relevancy value assigned to a particular review of the plurality of reviews is based on at least one of informational density of review content of the particular review or keywords in the review content of the particular review.

3. The computer-implemented method of claim 1, wherein a relevancy value assigned to a particular review of the plurality of reviews is based on review metadata associated with the particular review.

4. The computer-implemented method of claim 1, wherein inputting the input prompt into the generative language model yielding the summary review comprises:
- inputting the input prompt into the generative language model yielding attribute data associated with the subset of reviews generated by the generative language model; and
- inputting the attribute data into the generative language model yielding an initial summary generated by the generative language model.

5. The computer-implemented method of claim 4, further comprising:
- inputting the initial summary and context including one or more example summary reviews into the generative language model yielding a final summary generated by the generative language model, wherein the final summary comprises the summary review.

6. The computer-implemented method of claim 1, wherein the subset of reviews comprises reviews of the plurality of reviews having highest relevancy values.

7. The computer-implemented method of claim 1, wherein
- each subset of reviews of the plurality of subsets of reviews includes a number of reviews selected according to a review number sequence and wherein a subset of reviews in the review number sequence includes all reviews of a preceding subset of reviews in the review number sequence as well as additional reviews.

8. The computer-implemented method of claim 7, wherein the preceding subset of reviews in the review number sequence comprises an immediately preceding subset of reviews in the review number sequence.

9. A non-transitory computer-readable storage medium having stored thereon computer-executable instructions that, when executed, cause at least one processor to perform operations comprising:
- assigning relevancy values to reviews of a plurality of reviews;
- automatically aggregating a subset of reviews from the plurality of reviews into an input prompt, the subset of reviews selected based on the relevancy values assigned to reviews in the plurality of reviews and the subset of reviews comprising a defined number of reviews, wherein determining the defined number of reviews comprises:
  - generating a plurality of subsets of reviews, wherein each subset of reviews of the plurality of subsets of reviews includes a number of reviews;
  - for each subset of reviews of the plurality of subsets of reviews:
    - inputting that subset of reviews into a generative language model yielding a summary of that subset of reviews;
    - generating a semantic embedding of the summary of that subset of reviews; and
    - determining a distance between the semantic embedding of the summary of that subset of reviews and a corresponding semantic embedding of a preceding summary of a preceding subset of reviews of the plurality of subsets of reviews; and
  - determining, as the defined number of reviews, a number of reviews in a particular subset of reviews of the plurality of subsets of reviews having the distance below a distance threshold; and inputting the input prompt into a generative language model yielding a summary review of the subset of reviews generated by the generative language model.

10. The non-transitory computer-readable storage medium of claim 9, wherein a relevancy value assigned to a particular review of the plurality of reviews is based on at least one of:

informational density of review content of the particular review;

keywords in the review content of the particular review; or review metadata associated with the particular review.

11. The non-transitory computer-readable storage medium of claim 9, wherein the computer-executable instructions which cause the at least one processor to perform operations comprising inputting the input prompt into the generative language model yielding the summary review comprises instructions which cause the at least one processor to perform operations comprising:

inputting the input prompt into the generative language model yielding attribute data associated with the subset of reviews generated by the generative language model; and inputting the attribute data into the generative language model yielding an initial summary generated by the generative language model.

12. The non-transitory computer-readable storage medium of claim 11, further comprising computer-executable instructions which cause the at least one processor to perform operations comprising:

inputting the initial summary and context including one or more example summary reviews into the generative language model yielding a final summary generated by the generative language model, wherein the final summary comprises the summary review.

13. The non-transitory computer-readable storage medium of claim 9, wherein the subset of reviews comprises reviews of the plurality of reviews having highest relevancy values.

14. The non-transitory computer-readable storage medium of claim 9, wherein each subset of reviews of the plurality of subsets of reviews includes a number of reviews selected according to a review number sequence and wherein a subset of reviews in the review number sequence includes all reviews of a preceding subset of reviews in the review number sequence as well as additional reviews.

15. The non-transitory computer-readable storage medium of claim 14, wherein the preceding subset of reviews in the review number sequence comprises an immediately preceding subset of reviews in the review number sequence.

16. A system comprising:

at least one processor; and a non-transitory computer-readable storage medium having stored thereon computer-executable instructions that, when executed, cause the at least one processor to at least:

assign relevancy values to reviews of a plurality of reviews;

automatically aggregate a subset of reviews from the plurality of reviews into an input prompt, the subset of reviews selected based on the relevancy values assigned to reviews in the plurality of reviews and the subset of reviews comprising a defined number of reviews, wherein the computer-executable instructions further comprise computer-executable instructions that cause the at least one processor to determine the defined number of reviews by at least:

generating a plurality of subsets of reviews, wherein each subset of reviews of the plurality of subsets of reviews includes a number of reviews;

for each subset of reviews of the plurality of subsets of reviews:

inputting that subset of reviews into a generative language model yielding a summary of that subset of reviews;

generating a semantic embedding of the summary of that subset of reviews; and determining a distance between the semantic embedding of the summary of that subset of reviews and a corresponding semantic embedding of a preceding summary of a preceding subset of reviews of the plurality of subsets of reviews; and determining, as the defined number of reviews, a number of reviews in a particular subset of reviews of the plurality of subsets of reviews having the distance below a distance threshold; and input the input prompt into a generative language model yielding a summary review of the subset of reviews generated by the generative language model.

17. The system of claim 16, wherein a relevancy values assigned to a particular review of the plurality of reviews is based on at least one of:

informational density of review content of that review;

keywords in the review content of the particular review; or review metadata associated with that review.

18. The system of claim 16, wherein the computer-executable instructions which cause the at least one processor to input the input prompt into the generative language model yielding the summary review comprises computer-executable instructions which cause the at least one processor to at least:

input the input prompt into the generative language model yielding attribute data associated with the subset of reviews generated by the generative language model;

input the attribute data into the generative language model yielding an initial summary generated by the generative language model; and input the initial summary and context including one or more example summary reviews into the generative language model yielding a final summary generated by the generative language model, wherein the final summary comprises the summary review.

19. The system of claim 16, wherein the subset of reviews comprises reviews of the plurality of reviews having highest relevancy values.

20. The system of claim 16, wherein each subset of reviews of the plurality of subsets of reviews includes a number of reviews selected according to a review number sequence and wherein a subset of reviews in the review number sequence includes all reviews of a preceding subset of reviews in the review number sequence as well as additional reviews.

* * * * *